(12) United States Patent
Wang et al.

(10) Patent No.: US 12,674,962 B2
(45) Date of Patent: Jul. 7, 2026

(54) OPTICAL LENS ASSEMBLY AND PHOTOGRAPHING MODULE

(71) Applicant: NEWMAX TECHNOLOGY CO., LTD., Taichung City (TW)

(72) Inventors: Chi-Chang Wang, Taichung City (TW); Chun-Sheng Lee, Taichung City (TW); Sian-Chih Ke, Taichung City (TW); Jian Wang, Taichung City (TW)

(73) Assignee: NEWMAX TECHNOLOGY CO., LTD., Taichung City (TW)

( * ) Notice: Subject to any disclaimer, the term of this patent is extended or adjusted under 35 U.S.C. 154(b) by 317 days.

(21) Appl. No.: 18/594,490

(22) Filed: Mar. 4, 2024

(65) Prior Publication Data

US 2025/0216651 A1 Jul. 3, 2025

(30) Foreign Application Priority Data

Dec. 29, 2023 (TW) .................................. 112151506

(51) Int. Cl.
*G02B 13/00* (2006.01)
*G02B 9/34* (2006.01)
(52) U.S. Cl.
CPC ............. *G02B 13/004* (2013.01); *G02B 9/34* (2013.01)

(58) Field of Classification Search
CPC .... G02B 13/004; G02B 9/34; G02B 13/0015; G02B 13/06; G02B 13/18
USPC .......................................................... 359/715
See application file for complete search history.

(56) References Cited

U.S. PATENT DOCUMENTS

| | | | |
|---|---|---|---|
| 2018/0074288 A1* | 3/2018 | Lin ........................... | G02B 9/34 |
| 2021/0048607 A1* | 2/2021 | Liu ...................... | G02B 13/004 |
| 2021/0048617 A1* | 2/2021 | Kang ................... | G02B 13/004 |

* cited by examiner

*Primary Examiner* — Mohammed A Hasan
(74) *Attorney, Agent, or Firm* — Juan Carlos A. Marquez; Marquez IP Law Office, PLLC

(57) ABSTRACT

An optical lens assembly includes, in order from an object side to an image side: a first lens, a second lens, a third lens, and a fourth lens; wherein a distance from the object-side surface of the first lens to the image plane along the optical axis is TL, a half of a maximum field of view of the optical lens assembly is HFOV, a maximum optical effective radius of the image-side surface of the fourth lens is CA8, a maximum image height of the optical lens assembly is IMH, and the following condition is satisfied: $32.46 < TL*HFOV/(CA8*IMH) < 54.39$.

20 Claims, 17 Drawing Sheets

OPTICAL LENS ASSEMBLY AND PHOTOGRAPHING MODULE

CROSS-REFERENCE TO RELATED APPLICATION

This application claims the benefit of Taiwan Patent Application No. 112151506, filed on Dec. 29, 2023, which is hereby incorporated by reference for all purposes as if fully set forth herein.

BACKGROUND

Technical Field

The present disclosure relates to an optical lens assembly, and in particular, to an optical lens assembly and a photographing module applicable to an electronic device.

RELATED ART

In recent years, four-piece small lens module mounted on portable electronic devices such as mobile phones, tablets, and other wearable electronic devices have become a mainstream in the market. However, when these small lens modules need to achieve a large aperture and a wide viewing angle, generally there are sensitivity problems in manufacturing and assembly, mass production is more difficult and costly. On the other hand, in order to solve the sensitivity problems in manufacturing, some manufacturers have to sacrifice the quality of a peripheral image, so to result in blurring or deformation of the peripheral image.

The deficiencies in these existing technologies are mainly described in two aspects. First, the sensitivity improvement in manufacturing and assembly makes it more difficult to achieve stable and efficient mass production, especially while finishing the large aperture and the wide viewing angle. Secondly, in order to solve the sensitivity problems in manufacturing, manufacturers have to compromise on the quality of the peripheral image, so as to affect the quality of the overall image.

SUMMARY

An objective of the present disclosure is to resolve the above problems of the prior art. In order to achieve the above objective, the present disclosure provides an optical lens assembly, in order from an object side to an image side, comprising: a first lens with positive refractive power; a second lens with refractive power; a third lens with positive refractive power; and a fourth lens with negative refractive power.

A total quantity of lenses with refractive power in the optical lens assembly is four. A distance from an object-side surface of the first lens to an image plane along the optical axis is TL, a maximum field of view of the optical lens assembly is FOV, a half of a maximum field of view of the optical lens assembly is HFOV, a maximum optical effective radius of the object-side surface of the first lens is CA1, a maximum optical effective radius of an image-side surface of the third lens is CA6, a maximum optical effective radius of an image-side surface of the fourth lens is CA8, a maximum image height of the optical lens assembly is IMH, a central thickness of the third lens along the optical axis is CT3, an edge thickness of the third lens is ET3, a distance from the image-side surface of the fourth lens to the image plane along the optical axis is BFL, a distance in parallel with the optical axis from an axial point on the object-side surface of the first lens to a maximum optical effective radius position of the object-side surface of the first lens is TDP1, an entrance pupil diameter of the optical lens assembly is EPD, an Abbe number of the first lens is vd1, an Abbe number of the second lens is vd2, an Abbe number of the third lens is vd3, an incident angle where a chief ray is incident on the image plane at a maximum view angle of the optical lens assembly is CRA, a sum of the distances between any two adjacent lenses along the optical axis is $\Sigma AT$, a distance from the image-side surface of the first lens to the object-side surface of the second lens along the optical axis is T12, a distance from the image-side surface of the third lens to the object-side surface of the fourth lens along the optical axis is T34, a curvature radius of the object-side surface of the first lens is R1, a curvature radius of an image-side surface of the first lens is R2, a curvature radius of an image-side surface of the second lens is R4, a distance in parallel with the optical axis from an axial point on an image-side surface of the second lens to a maximum optical effective radius position of the image-side surface of the second lens is TDP4, a distance in parallel with the optical axis from an axial point on an image-side surface of the third lens to a maximum optical effective radius position of the image-side surface of the third lens is TDP6, a focal length of the fourth lens is f4, a distance perpendicular to the optical axis between a critical point on the image-side of the fourth lens and the optical axis is Y42C, and at least one condition is satisfied as follows:

$$32.46°/mm < TL * HFOV / (CA8 * IMH) < 54.39°/mm;$$

$$3.39\ mm < TL * (CT3 / ET3) < 6.83\ mm;$$

$$4.96 < BFL / TDP1 < 15.32;$$

$$3.53\ mm^{-1} < IMH / (EPD * CA1) < 7.28\ mm^{-1};$$

$$3.74 < (vd1 + vd3) / vd2 < 6.98;$$

$$29.61°/mm < CRA / EPD < 54.20°/mm;$$

$$0.99 < \sum AT / (T12 + T34) < 2.05;$$

$$-2354.04\ mm < R2 * R4 / R1 < 265.45\ mm;$$

$$2.99 < TDP6 / TDP4 < 80.51;$$

$$2.69 < CA6 / T34 < 28.28;$$

$$1.95 < TL / BFL < 3.43;$$

$$-5.90 < f4 / Y42C < -0.88;$$

$$1.81\ mm^{-1} < IMH * Tan(HFOV) / (BFL * CA6) < 4.38\ mm^{-1};$$

$$0.84 < TL / (Tan(HFOV) * IMH) < 1.74;$$

$$83.51° < FOV < 100.11°;$$

$$2.06\ mm < TL < 2.68\ mm;$$

and $$32.48° < CRA < 39.74°.$$

When the optical lens assembly satisfies the conditions of 32.46°/mm<TL*HFOV/(CA8*IMH)<54.39°/mm, in this way, the appropriate configuration can achieve a miniaturized optical lens assembly and meet the needs of a large viewing angle.

When the optical lens assembly satisfies the conditions of 3.39 mm<TL*(CT3/ET3)<6.83 mm, by appropriately arranging the ratio of the central thickness of the third lens to the edge thickness, the formability of the third lens can be effectively affected.

When the optical lens assembly satisfies the conditions of $4.96 < BFL/TDP1 < 15.32$, by appropriately configuring the distance in parallel with the optical axis from the axial point on the object-side surface of the first lens to the maximum optical effective radius position of the object-side surface of the first lens and the optical back focus length, the incident angle of the image sensor can be satisfied and the optical lens assembly can be miniaturized.

When the optical lens assembly satisfies the conditions of $3.53 \ \text{mm}^{-1} < IMH/(EPD*CA1) < 7.28 \ \text{mm}^{-1}$, in this way, the optical lens assembly has a larger amount of incident light.

When the optical lens assembly satisfies the conditions of $3.74 < (vd1+vd3)/vd2 < 6.98$, in this way, the lens material can be appropriately configured, and further the chromatic aberration problems can be reduced.

When the optical lens assembly satisfies the conditions of $29.61°/\text{mm} < CRA/EPD < 54.20°/\text{mm}$, in this way, the optical lens assembly has a larger amount of incident light.

When the optical lens assembly satisfies the conditions of $0.99 < \Sigma AT/(T12+T34) < 2.05$, in this way, the air gap of the optical lens assembly can be adjusted to achieve high resolution and miniaturization.

When the optical lens assembly satisfies the conditions of $-2354.04 \ \text{mm} < R2*R4/R1 < 265.45 \ \text{mm}$, in this way, the appropriate distribution of the curvature of the lens is beneficial to correcting the aberrations of the optical lens assembly to improve the image quality of the optical lens assembly.

When the optical lens assembly satisfies the conditions of $2.99 < TDP6/TDP4 < 80.51$, in this way, the distances in parallel with the optical axis from the axial points on the image-side surfaces of the second lens and the third lens to the maximum optical effective radius positions of the image-side surfaces of the second lens and the third lens can be appropriately matched, so as to achieve the effect of miniaturizing the module.

When the optical lens assembly satisfies the conditions of $2.69 < CA6/T34 < 28.28$, in this way, the appropriate configuration can reduce the optical distortion to improve image quality.

When the optical lens assembly satisfies the conditions of $1.95 < TL/BFL < 3.43$, in this way, the configuration of the optical lens assembly can be more appropriate, thereby achieving a miniaturized optical lens assembly.

When the optical lens assembly satisfies the conditions of $-5.90 < f4/Y42C < -0.88$, in this way, a suitable incident angle for the image sensor can be provided.

When the optical lens assembly satisfies the conditions of $1.81 \ \text{mm}^{-1} < IMH*Tan(HFOV)/(BFL*CA6) < 4.38 \ \text{mm}^{-1}$, in this way, the appropriate configuration can achieve a miniaturized optical lens assembly and meet the needs of a large viewing angle.

When the optical lens assembly satisfies the conditions of $0.84 < TL/(Tan(HFOV)*IMH) < 1.74$, in this way, the appropriate configuration can achieve a miniaturized optical lens assembly and meet the needs of a large viewing angle.

When the optical lens assembly satisfies the conditions of $83.51° < FOV < 100.11$, in this way, the maximum viewing angle of the optical lens assembly can be more appropriate to improve image quality.

When the optical lens assembly satisfies the conditions of $2.06 \ \text{mm} < TL < 2.68 \ \text{mm}$, in this way, the appropriate configuration can achieve a miniaturized optical lens assembly.

When the optical lens assembly satisfies the conditions of $32.48° < CRA < 39.74°$, in this way, the effect of a larger viewing angle can be achieved.

In addition, the present disclosure further provides a photographing module. The photographing module comprises: a lens barrel; an optical lens assembly disposed in the lens barrel; and an image sensor disposed on an image plane of the optical lens assembly.

The optical lens assembly, in order from an object side to an image side, comprises: a first lens with positive refractive power; a second lens with refractive power; a third lens with positive refractive power; and a fourth lens with negative refractive power.

A total quantity of lenses with refractive power in the optical lens assembly is four. A distance from an object-side surface of the first lens to an image plane along the optical axis is TL, a maximum field of view of the optical lens assembly is FOV, a half of a maximum field of view of the optical lens assembly is HFOV, a maximum optical effective radius of the object-side surface of the first lens is CA1, a maximum optical effective radius of an image-side surface of the third lens is CA6, a maximum optical effective radius of an image-side surface of the fourth lens is CA8, a maximum image height of the optical lens assembly is IMH, a central thickness of the third lens along the optical axis is CT3, an edge thickness of the third lens is ET3, a distance from the image-side surface of the fourth lens to the image plane along the optical axis is BFL, a distance in parallel with the optical axis from an axial point on the object-side surface of the first lens to a maximum optical effective radius position of the object-side surface of the first lens is TDP1, an entrance pupil diameter of the optical lens assembly is EPD, an Abbe number of the first lens is vd1, an Abbe number of the second lens is vd2, an Abbe number of the third lens is vd3, an incident angle where a chief ray is incident on the image plane at a maximum view angle of the optical lens assembly is CRA, a sum of the distances between any two adjacent lenses along the optical axis is $\Sigma AT$, a distance from the image-side surface of the first lens to the object-side surface of the second lens along the optical axis is T12, a distance from the image-side surface of the third lens to the object-side surface of the fourth lens along the optical axis is T34, a curvature radius of the object-side surface of the first lens is R1, a curvature radius of an image-side surface of the first lens is R2, a curvature radius of an image-side surface of the second lens is R4, a distance in parallel with the optical axis from an axial point on an image-side surface of the second lens to a maximum optical effective radius position of the image-side surface of the second lens is TDP4, a distance in parallel with the optical axis from an axial point on an image-side surface of the third lens to a maximum optical effective radius position of the image-side surface of the third lens is TDP6, a focal length of the fourth lens is f4, a distance perpendicular to the optical axis between a critical point on the image-side of the fourth lens and the optical axis is Y42C, and at least one condition is satisfied as follows:

$$32.46°/\text{mm} < TL*HFOV/(CA8*IMH) < 54.39°/\text{mm};$$

$$3.39 \ \text{mm} < TL*(CT3/ET3) < 6.83 \ \text{mm};$$

$$4.96 < BFL/TDP1 < 15.32;$$

$$3.53 \ \text{mm}^{-1} < IMH/(EPD*CA1) < 7.28 \ \text{mm}^{-1};$$

-continued $$3.74 < (vd1 + vd3)/vd2 < 6.98;$$

$$29.61°/\text{mm} < CRA/EPD < 54.20°/\text{mm};$$

$$-2354.04 \text{ mm} < R2*R4/R1 < 265.45 \text{ mm};$$

$$2.99 < TDP6/TDP4 < 80.51;$$

$$2.69 < CA6/T34 < 28.28;$$

$$1.95 < TL/BFL < 3.43;$$

$$-5.90 < f4/Y42C < -0.88;$$

$$1.81 \text{ mm}^{-1} < IMH*\text{Tan}(HFOV)/(BFL*CA6) < 4.38 \text{ mm}^{-1};$$

$$0.84 < TL/(\text{Tan}(HFOV)*IMH) < 1.74;$$

$$83.51° < FOV < 100.11°;$$

$$2.06 \text{ mm} < TL < 2.68 \text{ mm};$$

and $$32.48° < CRA < 39.74°.$$

When the optical lens assembly satisfies the conditions of 32.46°/mm<TL*HFOV/(CA8*IMH)<54.39°/mm, in this way, the appropriate configuration can achieve a miniaturized optical lens assembly and meet the needs of a large viewing angle.

When the optical lens assembly satisfies the conditions of 3.39 mm<TL*(CT3/ET3)<6.83 mm, by appropriately arranging the ratio of the central thickness of the third lens to the edge thickness, the formability of the third lens can be effectively affected.

When the optical lens assembly satisfies the conditions of 4.96<BFL/TDP1<15.32, by appropriately configuring the distance in parallel with the optical axis from the axial point on the object-side surface of the first lens to the maximum optical effective radius position of the object-side surface of the first lens and the optical back focus length, the incident angle of the image sensor can be satisfied and the optical lens assembly can be miniaturized.

When the optical lens assembly satisfies the conditions of 3.53 mm$^{-1}$<IMH/(EPD*CA1)<7.28 mm$^{-1}$, in this way, the optical lens assembly has a larger amount of incident light.

When the optical lens assembly satisfies the conditions of 3.74<(vd1+vd3)/vd2<6.98, in this way, the lens material can be appropriately configured, and further the chromatic aberration problems can be reduced.

When the optical lens assembly satisfies the conditions of 29.61°/mm<CRA/EPD<54.20°/mm, in this way, the optical lens assembly has a larger amount of incident light.

When the optical lens assembly satisfies the conditions of 0.99<ΣAT/(T12+T34)<2.05, in this way, the air gap of the optical lens assembly can be adjusted to achieve high resolution and miniaturization.

When the optical lens assembly satisfies the conditions of −2354.04 mm<R2*R4/R1<265.45 mm, in this way, the appropriate distribution of the curvature of the lens is beneficial to correcting the aberrations of the optical lens assembly to improve the image quality of the optical lens assembly.

When the optical lens assembly satisfies the conditions of 2.99<TDP6/TDP4<80.51, in this way, the distances in parallel with the optical axis from the axial points on the image-side surfaces of the second lens and the third lens to the maximum optical effective radius positions of the image-side surfaces of the second lens and the third lens can be appropriately matched, so as to achieve the effect of miniaturizing the module.

When the optical lens assembly satisfies the conditions of 2.69<CA6/T34<28.28, in this way, the appropriate configuration can reduce the optical distortion to improve image quality.

When the optical lens assembly satisfies the conditions of 1.95<TL/BFL<3.43, in this way, the configuration of the optical lens assembly can be more appropriate, thereby achieving a miniaturized optical lens assembly.

When the optical lens assembly satisfies the conditions of −5.90<f4/Y42C<−0.88, in this way, a suitable incident angle for the image sensor can be provided.

When the optical lens assembly satisfies the conditions of 1.81 mm$^{-1}$<IMH*Tan(HFOV)/(BFL*CA6)<4.38 mm$^{-1}$, in this way, the appropriate configuration can achieve a miniaturized optical lens assembly and meet the needs of a large viewing angle.

When the optical lens assembly satisfies the conditions of 0.84<TL/(Tan(HFOV)*IMH)<1.74, in this way, the appropriate configuration can achieve a miniaturized optical lens assembly and meet the needs of a large viewing angle.

When the optical lens assembly satisfies the conditions of 83.51°<FOV<100.11°, in this way, the maximum viewing angle of the optical lens assembly can be more appropriate to improve image quality.

When the optical lens assembly satisfies the conditions of 2.06 mm<TL<2.68 mm, in this way, the appropriate configuration can achieve a miniaturized optical lens assembly.

When the optical lens assembly satisfies the conditions of 32.48°<CRA<39.74°, in this way, the effect of a larger viewing angle can be achieved.

7

Figure 7A:
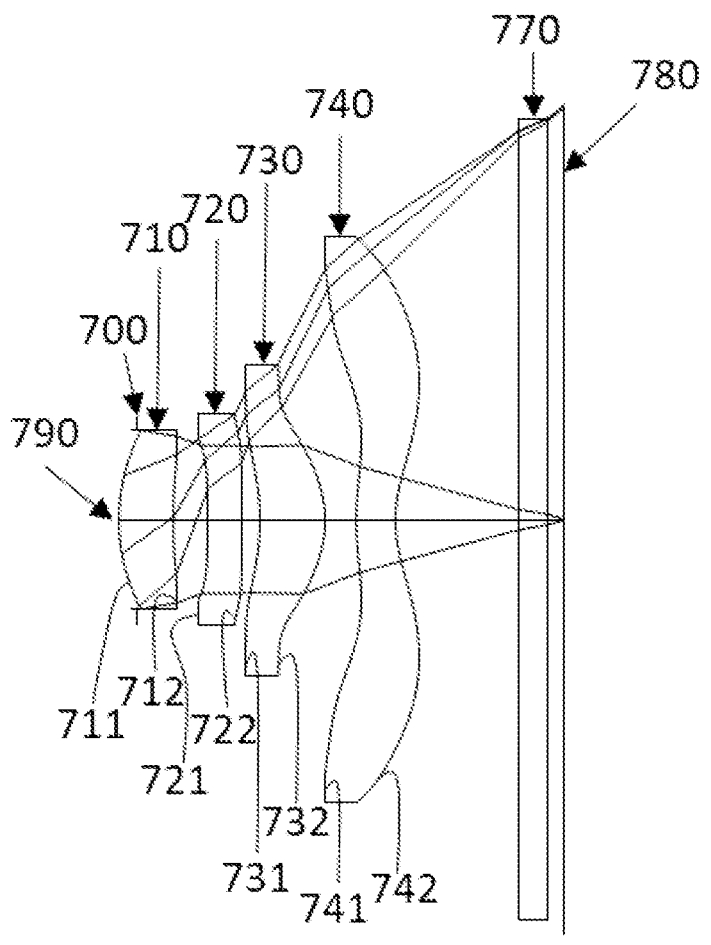

FIG. 7A is a schematic view of an optical lens assembly according to a fifth embodiment of the present disclosure of the present disclosure.

Figure 7B:
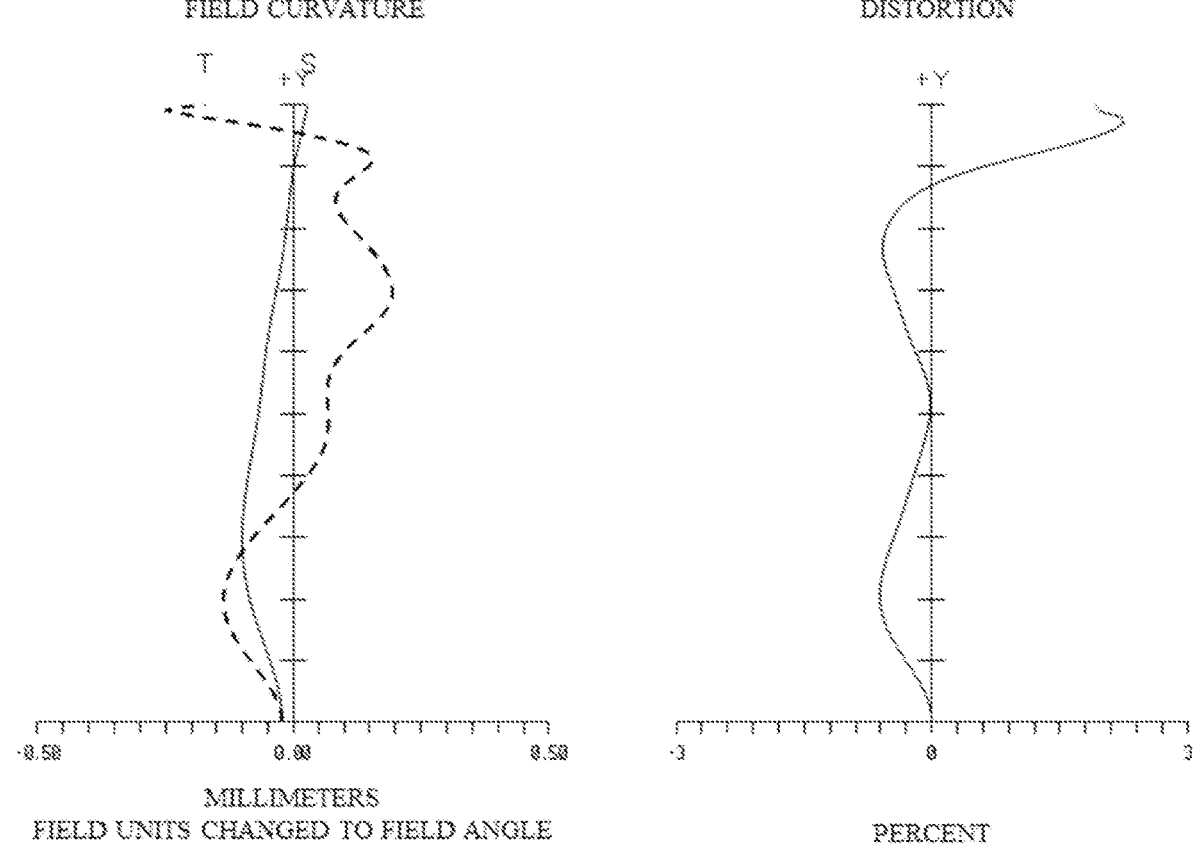

FIG. 7B shows a field curvature curves and a distortion curve of the optical lens assembly according to the fifth embodiment.

Figure 8A:
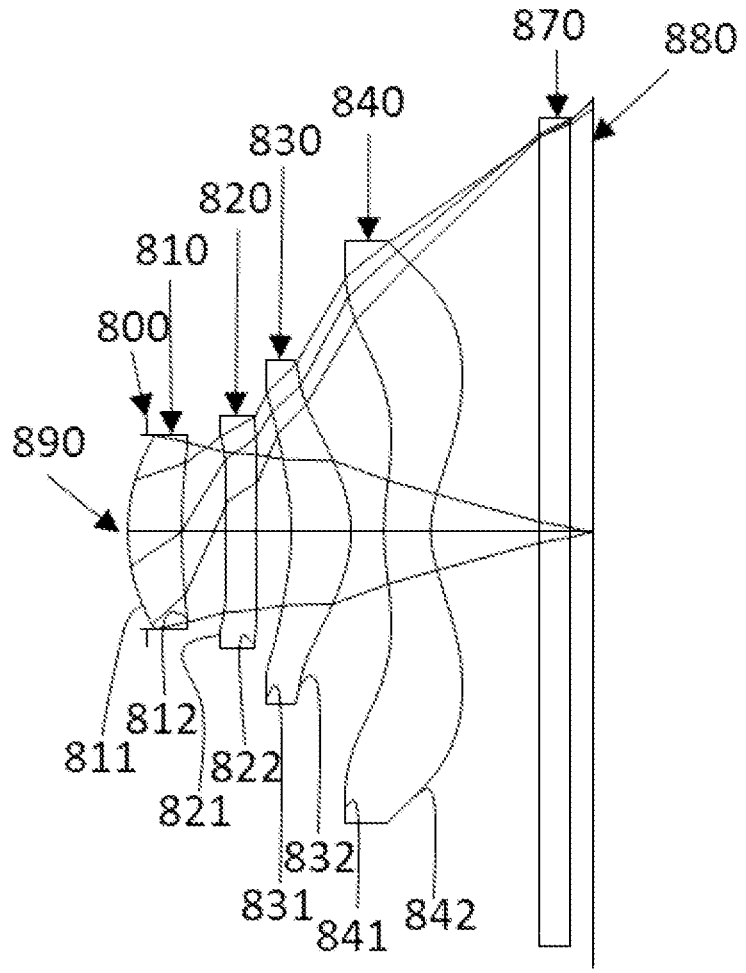

FIG. 8A is a schematic view of an optical lens assembly according to a fifth embodiment of the present disclosure of the present disclosure.

Figure 8B:
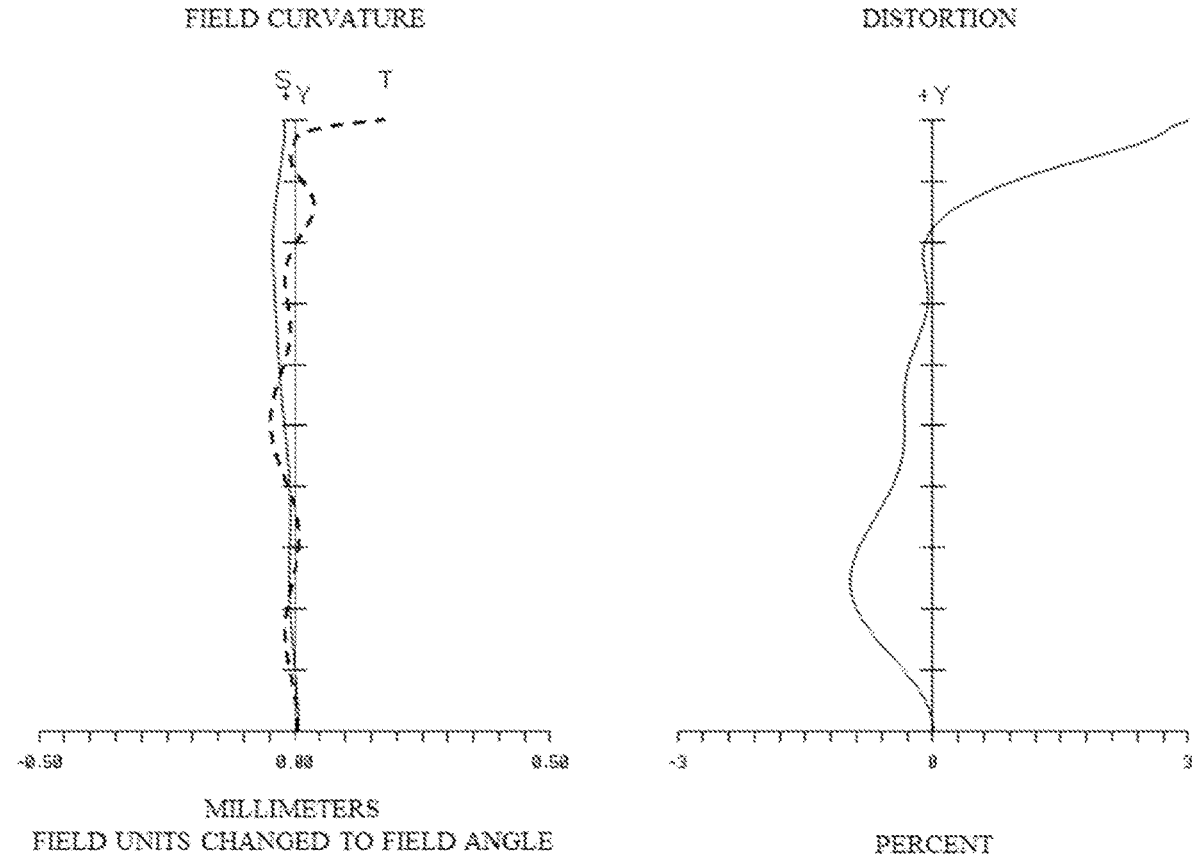

FIG. 8B shows a field curvature curves and a distortion curve of the optical lens assembly according to the fifth embodiment.

Figure 9:
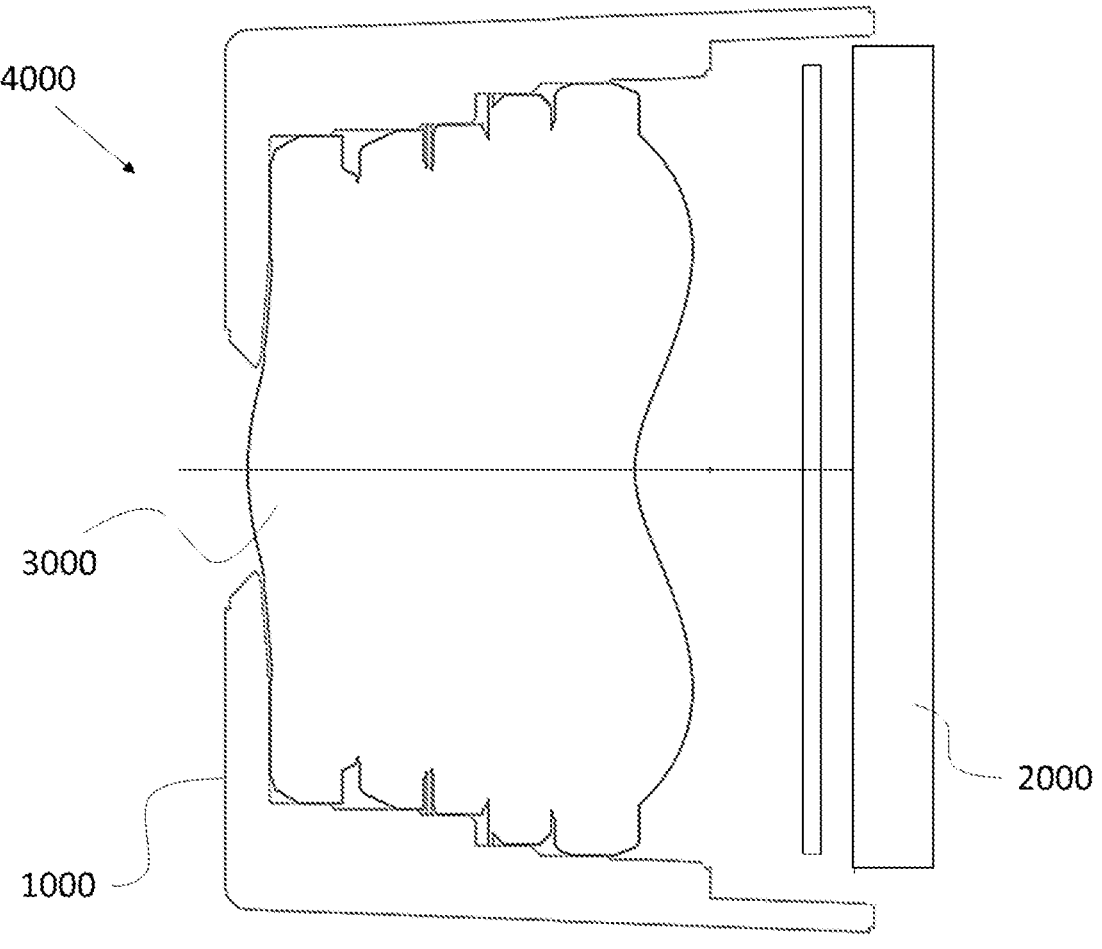

FIG. 9 is a schematic view of a photographing module according to a seventh embodiment of the present disclosure.

DETAILED DESCRIPTION

In order to enable a person of ordinary skill in the art to understand and realize the contents of the present disclosure, the following are illustrated by proper embodiments with accompanying drawings, and the equivalent substitutions and modifications based on the contents of the present disclosure are included in the scope of the present disclosure. It is also stated that the accompanying drawings of the present disclosure are not depictions of actual dimensions, and although the present disclosure provides embodiments of particular parameters, it is to be understood that the parameters need not be exactly equal to their corresponding values, and that, within an acceptable margin of error, are approximate to their corresponding parameters. The following embodiments will further detail the technical aspects of the present disclosure, but the disclosure is not intended to limit the scope of the present disclosure.

First Embodiment

Figure 1A:
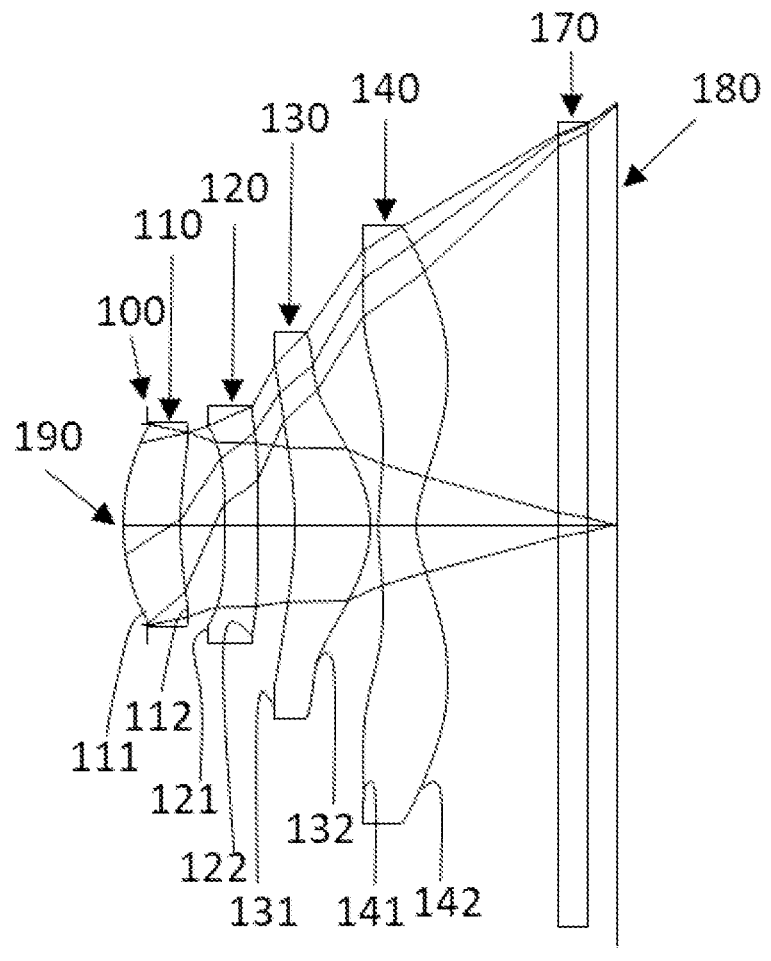
FIG. 1A is a schematic view of an optical lens assembly according to a first embodiment of the present disclosure.
Figure 1B:
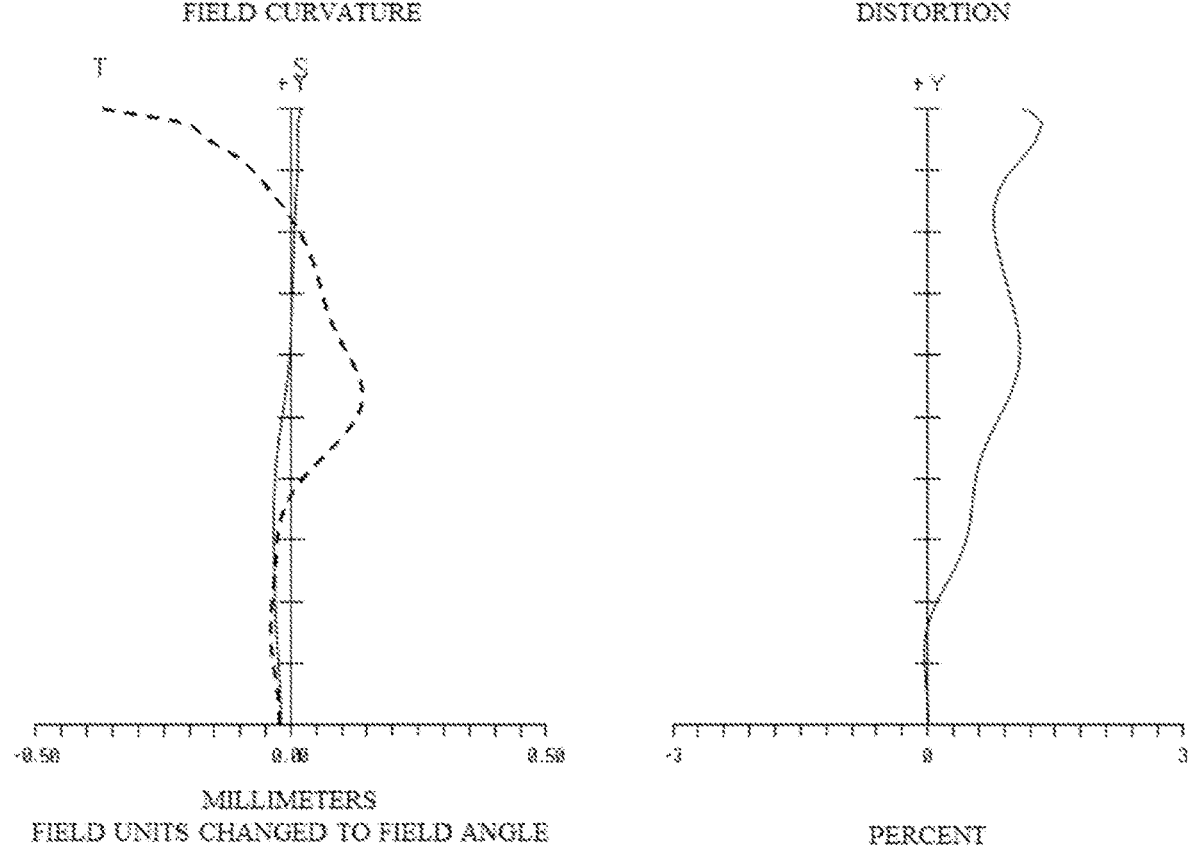
FIG. 1B sequentially shows a field curvature curve and a distortion curve of an optical lens assembly according to a first embodiment.

Refer to FIG. 1A and FIG. 1B. FIG. 1A is a schematic view of an optical lens assembly according to a first embodiment of the present disclosure, and FIG. 1B shows a field curvature curve and a distortion curve of an optical lens assembly according to a first embodiment. As can be seen from FIG. 1A, the optical lens assembly includes, in order from an object side to an image side: a stop 100, a first lens 110, a second lens 120, a third lens 130, a fourth lens 140, an IR-cut filter 170, and an image plane 180. A total quantity of lenses with refractive power in the optical lens assembly is four.

The first lens 110 with positive refractive power is made of a plastic material and includes an object-side surface 111 and an image-side surface 112, wherein the object-side surface 111 of the first lens 110 is convex near an optical axis 190, and the image-side surface 112 of the first lens 110 is concave near the optical axis 190. The object-side surface 111 and the image-side surface 112 are aspheric.

The second lens 120 with negative refractive power is made of a plastic material and includes an object-side surface 121 and an image-side surface 122, wherein the object-side surface 121 of the second lens 120 is concave near the optical axis 190, and the image-side surface 122 of the second lens 120 is concave near the optical axis 190. The object-side surface 121 and the image-side surface 122 are aspheric.

The third lens 130 with positive refractive power is made of a plastic material and includes an object-side surface 131 and an image-side surface 132, wherein the object-side surface 131 of the third lens 130 is concave near an optical axis 190, and the image-side surface 132 of the third lens 130 is convex near the optical axis 190. The object-side surface 131 and the image-side surface 132 are aspheric.

The fourth lens 140 with negative refractive power is made of a plastic material and includes an object-side surface 141 and an image-side surface 142, wherein the object-side surface 141 of the fourth lens 140 is convex near an optical axis 190, and the image-side surface 142 of the fourth lens 140 is concave near the optical axis 190. The object-side surface 141 and the image-side surface 142 are aspheric.

The IR-cut filter 170 is made of glass, and is disposed between the fourth lens 140 and the image plane 180 without affecting a focal length of the optical lens assembly. It can be understood that, the IR-cut filter 170 may also be formed on the surface of the above-mentioned lens. The IR-cut filter 170 may also be made of other materials.

An aspheric curve equation of the above-mentioned lenses is expressed as follows:

$$z(h) = \frac{ch^2}{1 + \left[1 - (k+1)c^2h^2\right]^{0.5}} + \sum (A_i) \cdot (h^i)$$

wherein, z is a position value in the direction of the optical axis 190 and with a surface vertex as a reference at a position of a height h; c is a curvature of a lens surface near the optical axis 190, and is a reciprocal of a curvature radius (R) (c=1/R), R is a curvature radius of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view in the optical lens assembly is FOV, and values are as follows: f=1.85 mm, Fno=2.05, IMH=1.90 mm, CRA=34.63°, TDP1=0.13 mm, TDP4=0.03 mm, TDP6=0.07 mm, CA1=0.45 mm, CA6=0.87 mm, CA8=1.35 mm, Y42C=0.69 mm, ET3=0.15 mm, and FOV=90.02°.

In the optical lens assembly of the first embodiment, a distance from an object-side surface 111 of the first lens 110 to an image plane 180 along an optical axis 190 is TL, a half of a maximum field of view of the optical lens assembly is HFOV, a maximum optical effective radius of an image-side surface 142 of the fourth lens 140 is CA8, a maximum image height of the optical lens assembly is IMH, and the following condition is satisfied: TL*HFOV/(CA8*IMH)=41.92°/mm.

In the optical lens assembly of the first embodiment, a central thickness of the third lens 130 along the optical axis 190 is CT3, an edge thickness of the third lens 130 is ET3, and the following condition is satisfied: TL*(CT3/ET3)=5.69 mm. The edge thickness is defined as a distance parallel to the optical axis 190 and between the object-side surface 131 and the image-side surface 132 of the third lens 130 at the maximum effective diameter position.

In the optical lens assembly of the first embodiment, a distance from the image-side surface 142 of the fourth lens 140 to the image plane 180 along the optical axis 190 is BFL, a distance in parallel with the optical axis 190 from an axial point on the object-side surface 111 of the first lens 110 to a maximum optical effective radius position of the object-side surface 111 of the first lens 110 is TDP1, and the following condition is satisfied: BFL/TDP1=7.42.

In the optical lens assembly of the first embodiment, an entrance pupil diameter of the optical lens assembly is EPD, a maximum optical effective radius of the object-side surface 111 of the first lens 110 is CA1, and the following condition is satisfied: IMH/(EPD*CA1)=4.67 mm$^{-1}$.

In the optical lens assembly of the first embodiment, an Abbe number of the first lens 110 is vd1, an Abbe number of the second lens 120 is vd2, an Abbe number of the third lens 130 is vd3, and the following condition is satisfied: (vd1+vd3)/vd2=5.50.

In the optical lens assembly of the first embodiment, an incident angle where a chief ray is incident on the image plane at a maximum view angle of the optical lens assembly is CRA, an entrance pupil diameter of the optical lens assembly is EPD, and the following condition is satisfied: CRA/EPD=38.38°/mm.

In the optical lens assembly of the first embodiment, a sum of the distances between any two adjacent lenses along the optical axis 190 is ΣAT, a distance from the image-side surface 112 of the first lens 110 to the object-side surface 121 of the second lens 120 along the optical axis 190 is T12, a distance from the image-side surface 132 of the third lens 130 to the object-side surface 141 of the fourth lens 140 along the optical axis is T34, and the following condition is satisfied: ΣAT/(T12+T34)=1.71.

In the optical lens assembly of the first embodiment, a curvature radius of the object-side surface 111 of the first lens 110 is R1, a curvature radius of an image-side surface 112 of the first lens 110 is R2, a curvature radius of an image-side surface 122 of the second lens 120 is R4, and the following condition is satisfied: R2*R4/R1=127.19 mm.

In the optical lens assembly of the first embodiment, a distance in parallel with the optical axis 190 from an axial point on an image-side surface 122 of the second lens 120 to a maximum optical effective radius position of the image-side surface 122 of the second lens 120 is TDP4, a distance in parallel with the optical axis 190 from an axial point on an image-side surface 132 of the third lens 130 to a maximum optical effective radius position of the image-side surface 132 of the third lens 130 is TDP6, and the following condition is satisfied: TDP6/TDP4=10.32.

In the optical lens assembly of the first embodiment, a maximum optical effective radius of an image-side surface 132 of the third lens 130 is CA6, a distance from the image-side surface 132 of the third lens 130 to the object-side surface 141 of the fourth lens 140 along the optical axis 190 is T34, and the following condition is satisfied: CA6/T34=23.40.

In the optical lens assembly of the first embodiment, a distance from the image-side surface 142 of the fourth lens 140 to the image plane 180 along the optical axis 190 is BFL, and the following condition is satisfied: TL/BFL=2.46.

In the optical lens assembly of the first embodiment, a focal length of the fourth lens is f4, a distance perpendicular to the optical axis 190 between a critical point on the image-side surface 142 of the fourth lens 140 and the optical axis 190 is Y42C, and the following condition is satisfied: f4/Y42C=−1.66. The critical point of the lens surface usually refers to the tangent point between the plane perpendicular to the optical axis and the lens surface, and the critical point is far away from the optical axis. In the first embodiment and other embodiments of the present disclosure, each lens can have one or more critical points far away from the optical axis.

In the optical lens assembly of the first embodiment, a distance from the image-side surface 142 of the fourth lens 140 to the image plane 180 along the optical axis 190 is BFL, a maximum optical effective radius of the image-side surface 132 of the third lens 130 is CA6, and the following condition is satisfied: IMH*Tan(HFOV)/(BFL*CA6)=2.26 mm$^{-1}$.

In the optical lens assembly of the first embodiment, the following conditions are satisfied: TL/(Tan(HFOV)*IMH)=1.25.

In the optical lens assembly of the first embodiment, the following conditions are satisfied: CRA=34.63°.

In the optical lens assembly of the first embodiment, the following conditions are satisfied: TL=2.38 mam.

Refer to Table 1 and Table 2 below.

TABLE 1

| First embodiment f (focal length) = 1.85 mm (millimeters), Fno (f-number) = 2.05, FOV (field of view) = 90.02° (degrees). | | | | | | |
|---|---|---|---|---|---|---|
| Surface | | Curvature radius (mm) | Central thickness/gap (mm) | Material | Refractive index (nd) | Abbe number (vd) | Focal length (mm) |
| 0 | Object | Infinity | 600.000 | | | | |
| 1 | Stop | Infinity | −0.121 | | | | |
| 2 | First lens | 0.799 (ASP) | 0.281 | Plastic | 1.54 | 55.99 | 2.22 |
| 3 | | 2.050 (ASP) | 0.205 | | | | |
| 4 | Second lens | −4.903 (ASP) | 0.166 | Plastic | 1.66 | 20.37 | −6.68 |
| 5 | | 49.582 (ASP) | 0.172 | | | | |
| 6 | Third lens | −1.664 (ASP) | 0.365 | Plastic | 1.54 | 55.99 | 1.00 |
| 7 | | −0.442 (ASP) | 0.037 | | | | |
| 8 | Fourth lens | 1.124 (ASP) | 0.188 | Plastic | 1.54 | 55.99 | −1.14 |
| 9 | | 0.378 (ASP) | 0.683 | | | | |
| 10 | IR-cut filter | Infinity | 0.145 | Glass | 1.52 | 64.17 | |
| 11 | | Infinity | 0.140 | | | | |
| 12 | Image Plane | Infinity | — | | | | |

Reference wavelength 555 nm

TABLE 2

| | Aspheric coefficient | | | |
|---|---|---|---|---|
| Surface | 2 | 3 | 4 | 5 |
| K: | −6.5811E+00 | −5.4361E+01 | 9.5254E+01 | 8.0384E+02 |
| A2: | 0.0000E+00 | 0.0000E+00 | 0.0000E+00 | 0.0000E+00 |
| A4: | −3.5419E+00 | −1.5988E+00 | 2.5488E+00 | −8.7159E−01 |
| A6: | 4.6844E+02 | 2.4239E+02 | −3.0605E+02 | 2.4060E+01 |
| A8: | −2.4773E+04 | −1.4924E+04 | 1.4907E+04 | −1.2443E+03 |
| A10: | 8.2152E+05 | 5.5350E+05 | −4.7065E+05 | 4.0111E+04 |
| A12: | −1.8371E+07 | −1.3547E+07 | 1.0197E+07 | −8.6187E+05 |
| A14: | 2.8857E+08 | 2.2887E+08 | −1.5725E+08 | 1.2746E+07 |
| A16: | −3.2630E+09 | −2.7414E+09 | 1.7614E+09 | −1.3272E+08 |
| A18: | 2.6891E+10 | 2.3604E+10 | −1.4451E+10 | 9.8585E+08 |
| A20: | −1.6174E+11 | −1.4648E+11 | 8.6666E+10 | −5.2382E+09 |
| A22: | 7.0246E+11 | 6.4902E+11 | −3.7492E+11 | 1.9728E+10 |
| A24: | −2.1455E+12 | −2.0014E+12 | 1.1371E+12 | −5.1353E+10 |
| A26: | 4.3710E+12 | 4.0795E+12 | −2.2906E+12 | 8.7762E+10 |
| A28: | −5.3325E+12 | −4.9389E+12 | 2.7483E+12 | −8.8496E+10 |
| A30: | 2.9460E+12 | 2.6886E+12 | −1.4843E+12 | 3.9860E+10 |
| Surface | 6 | 7 | 8 | 9 |
| K: | 3.4626E+00 | −2.1370E+00 | −4.9336E+01 | −4.9955E+00 |
| A2: | 0.0000E+00 | 0.0000E+00 | 0.0000E+00 | 0.0000E+00 |
| A4: | −8.9609E−01 | 4.0607E−01 | −6.9549E−02 | −1.2298E+00 |
| A6: | 6.3595E+01 | 2.2328E+01 | −8.8813E+00 | 3.7508E+00 |
| A8: | −1.5283E+03 | −5.7193E+02 | 5.8768E+01 | −1.0611E+01 |
| A10: | 2.2881E+04 | 6.7370E+03 | −2.1933E+02 | 2.5922E+01 |
| A12: | −2.3234E+05 | −4.9233E+04 | 5.4140E+02 | −5.4102E+01 |
| A14: | 1.6640E+06 | 2.4452E+05 | −9.0610E+02 | 9.4846E+01 |
| A16: | −8.5724E+06 | −8.5713E+05 | 1.0207E+03 | −1.3593E+02 |
| A18: | 3.2037E+07 | 2.1607E+06 | −7.3541E+02 | 1.5413E+02 |
| A20: | −8.6762E+07 | −3.9392E+06 | 2.7478E+02 | −1.3362E+02 |
| A22: | 1.6823E+08 | 5.1543E+06 | 2.5715E+01 | 8.5415E+01 |
| A24: | −2.2725E+08 | −4.7212E+06 | −8.6365E+01 | −3.8560E+01 |
| A26: | 2.0286E+08 | 2.8736E+06 | 4.4126E+01 | 1.1543E+01 |
| A28: | −1.0745E+08 | −1.0435E+06 | −1.0526E+01 | −2.0445E+00 |
| A30: | 2.5548E+07 | 1.7094E+05 | 1.0192E+00 | 1.6156E−01 |

Table 1 shows detailed configuration data of the first embodiment in FIG. 1A. Units of the curvature radius, the central thickness, the gap, and the focal length is mm. Surfaces 0 to 12 sequentially represent surfaces from an object side to an image side. Surface 0 is a gap between the object and the stop 100. Surface 1 is a gap between the stop 100 and the object-side surface 111 of the first lens 110. The object-side surface 111 of the first lens 110 is closer to the object side than the stop 100, and therefore the stop 100 is represented by a negative value. Otherwise, if the stop 100 is closer to the object side than the object-side surface 111 of the first lens 110, the stop 100 is represented by a positive value. Surfaces 2, 4, 6, 8 and 10 are respectively central thicknesses of the first lens 110, the second lens 120, the third lens 130, the fourth lens 140, and the IR-cut filter 170 along the optical axis 190. Surfaces 3, 5, 7, 9 and 11 respectively are a gap between the first lens 110 and the second lens 120 along the optical axis 190, a gap between the second lens 120 and the third lens 130 along the optical axis 190, a gap between the third lens 130 and the fourth lens 140 along the optical axis 190, a gap between the fourth lens 140 and the IR-cut filter 170 along the optical axis 190, and a gap between the IR-cut filter 170 and the image plane 180 along the optical axis 190.

Table 2 shows aspheric data in the first embodiment. k represents a conic constant in an aspheric curve equation, and A2, A4, A6, A8, A10, A12, A14, A16, A18, A20, A22, A24, A26, A28 and A30 are high-order aspheric coefficients. In addition, the following tables of embodiments are schematic diagrams and aberration curves corresponding to the embodiments. The definitions of data in the tables of the embodiments are the same as the definitions in Table 1 and Table 2 of the first embodiment, and are not repeated herein.

Second Embodiment

Figure 2A:
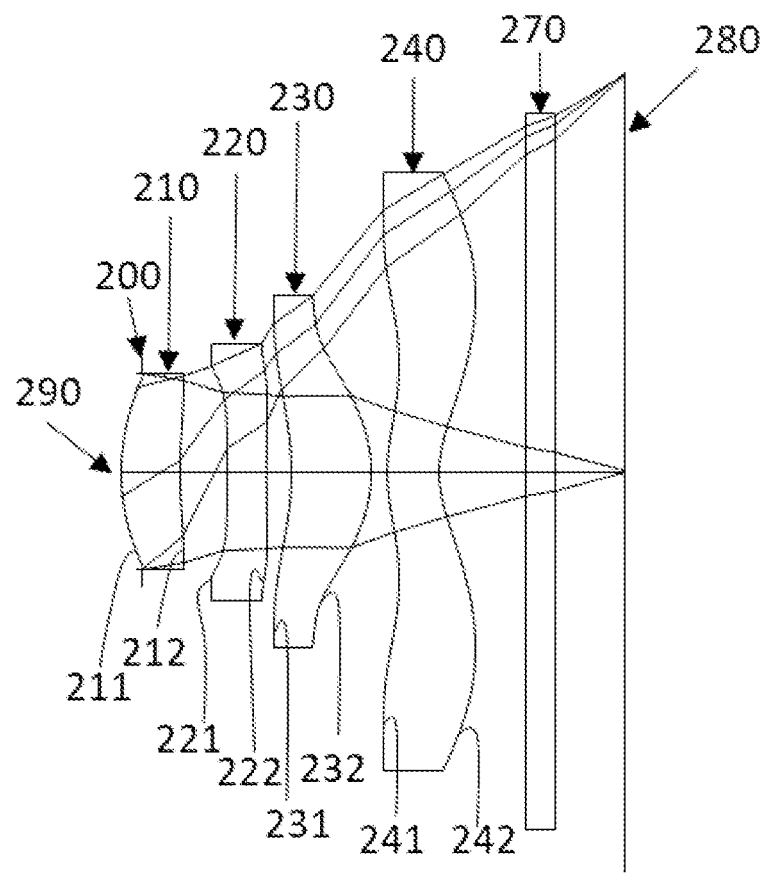
FIG. 2A is a schematic view of an optical lens assembly according to a second embodiment of the present disclosure.
Figure 2B:
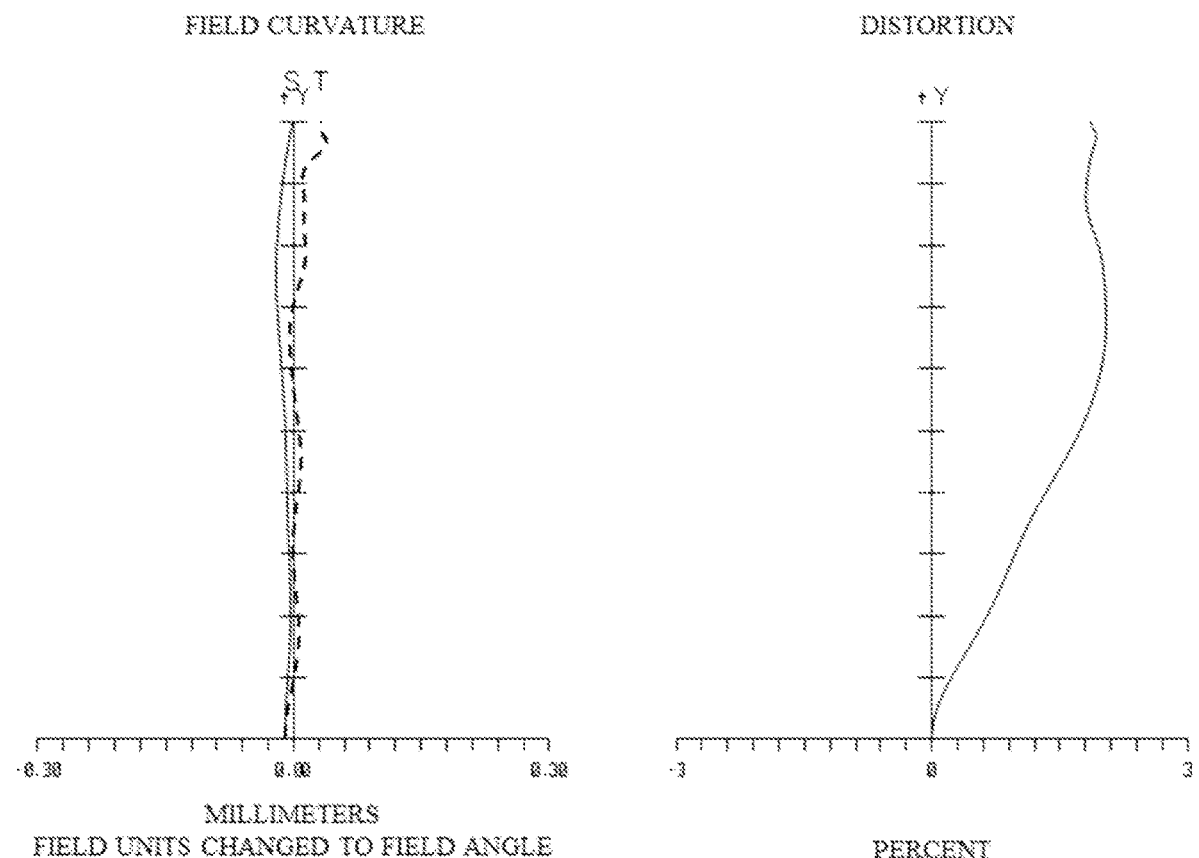
FIG. 2B sequentially shows a field curvature curve and a distortion curve of an optical lens assembly according to a second embodiment.

Refer to FIG. 2A and FIG. 2B. FIG. 2A is a schematic view of an optical lens assembly according to a second embodiment of the present disclosure, and FIG. 2B shows a field curvature curve and a distortion curve of an optical lens assembly according to a second embodiment. As can be seen from FIG. 2A, the optical lens assembly includes, in order from an object side to an image side: a stop 200, a first lens 210, a second lens 220, a third lens 230, a fourth lens 240, an IR-cut filter 270, and an image plane 280. A total quantity of lenses with refractive power in the optical lens assembly is four, but not limited thereto.

The first lens 210 with positive refractive power is made of a plastic material and includes an object-side surface 211 and an image-side surface 212, wherein the object-side surface 211 of the first lens 210 is convex near an optical axis 290, and the image-side surface 212 of the first lens 210 is concave near the optical axis 290. The object-side surface 211 and the image-side surface 212 are aspheric.

The second lens 220 with negative refractive power is made of a plastic material and includes an object-side surface 221 and an image-side surface 222, wherein the object-side surface 221 of the second lens 220 is convex near the optical axis 290, and the image-side surface 222 of the second lens 220 is concave near the optical axis 290. The object-side surface 221 and the image-side surface 222 are aspheric.

The third lens 230 with positive refractive power is made of a plastic material and includes an object-side surface 231 and an image-side surface 232, wherein the object-side surface 231 of the third lens 230 is concave near an optical axis 290, and the image-side surface 232 of the third lens 230 is convex near the optical axis 290. The object-side surface 231 and the image-side surface 232 are aspheric.

The fourth lens 240 with negative refractive power is made of a plastic material and includes an object-side surface 241 and an image-side surface 242, wherein the object-side surface 241 of the fourth lens 240 is convex near an optical axis 290, and the image-side surface 242 of the fourth lens 240 is concave near the optical axis 290. The object-side surface 241 and the image-side surface 242 are aspheric.

The IR-cut filter 270 is made of glass, and is disposed between the fourth lens 240 and the image plane 280 without affecting a focal length of the optical lens assembly. It can be understood that, the IR-cut filter 270 may also be formed on the surface of the above-mentioned lens. The IR-cut filter 270 may also be made of other materials.

Refer to Table 3, Table 4 and Table 5 below.

TABLE 3

Second embodiment
f (focal length) = 1.84 mm (millimeters), Fno (f-number) =
2.07, FOV (field of view) = 87.91° (degrees).

| Surface | | Curvature radius (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | Stop | Infinity | | −0.107 | | | | |
| 2 | First lens | 0.907 | (ASP) | 0.289 | Plastic | 1.54 | 55.99 | 2.41 |
| 3 | | 2.589 | (ASP) | 0.233 | | | | |
| 4 | Second lens | 32.446 | (ASP) | 0.190 | Plastic | 1.67 | 19.24 | −12.87 |
| 5 | | 6.857 | (ASP) | 0.123 | | | | |
| 6 | Third lens | −1.109 | (ASP) | 0.390 | Plastic | 1.54 | 55.99 | 1.87 |
| 7 | | −0.597 | (ASP) | 0.078 | | | | |
| 8 | Fourth lens | 0.798 | (ASP) | 0.255 | Plastic | 1.54 | 55.99 | −2.77 |
| 9 | | 0.464 | (ASP) | 0.423 | | | | |
| 10 | IR-cut filter | Infinity | | 0.145 | Glass | 1.52 | 64.17 | |
| 11 | | Infinity | | 0.343 | | | | |
| 12 | Image Plane | Infinity | | — | | | | |

Reference wavelength 555 nm

TABLE 4

Aspheric coefficient

| Surface | 2 | 3 | 4 | 5 |
|---|---|---|---|---|
| K: | −5.5482E+00 | −5.6810E+01 | −9.9000E+01 | 0.0000E+00 |
| A2: | 0.0000E+00 | 0.0000E+00 | 0.0000E+00 | 0.0000E+00 |
| A4: | 6.4942E−01 | 2.0860E−01 | −1.0465E+00 | −2.5834E−01 |
| A6: | 1.2061E+01 | −6.3867E+00 | 1.8482E+00 | 2.0180E+00 |
| A8: | −4.2051E+02 | 1.3526E+02 | −1.1222E+02 | −9.6801E+01 |
| A10: | 7.4530E+03 | −2.5699E+03 | 1.5308E+03 | 1.2920E+03 |
| A12: | −8.0733E+04 | 2.9367E+04 | −1.2780E+04 | −9.7079E+03 |
| A14: | 5.4480E+05 | −2.0605E+05 | 6.5102E+04 | 4.3891E+04 |
| A16: | −2.2368E+06 | 8.6457E+05 | −2.0650E+05 | −1.1936E+05 |
| A18: | 5.1155E+06 | −1.9904E+06 | 4.1349E+05 | 1.8199E+05 |
| A20: | −5.0033E+06 | 1.9327E+06 | −4.1181E+05 | −1.1939E+05 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

| Surface | 6 | 7 | 8 | 9 |
|---|---|---|---|---|
| K: | −1.0497E+01 | −1.0906E+00 | −1.0000E+00 | −1.0000E+00 |
| A2: | 0.0000E+00 | 0.0000E+00 | 0.0000E+00 | 0.0000E+00 |
| A4: | 2.9167E−01 | −4.5217E−02 | −2.9426E+00 | −4.2402E+00 |
| A6: | −1.9383E+00 | −6.7130E−01 | 8.8408E+00 | 1.6823E+01 |
| A8: | −1.7739E+01 | 3.2700E+01 | −1.9788E+01 | −6.0776E+01 |
| A10: | 4.5089E+02 | −3.1556E+02 | 1.1041E+01 | 1.7679E+02 |
| A12: | −3.1151E+03 | 1.5757E+03 | 1.2035E+02 | −3.9681E+02 |
| A14: | 1.0735E+04 | −4.2386E+03 | −5.2851E+02 | 6.7667E+02 |
| A16: | −2.0355E+04 | 6.2765E+03 | 1.1963E+03 | −8.7035E+02 |
| A18: | 2.0428E+04 | −4.8553E+03 | −1.7541E+03 | 8.3869E+02 |
| A20: | −8.5447E+03 | 1.5400E+03 | 1.7658E+03 | −5.9915E+02 |
| A22: | 0.0000E+00 | 0.0000E+00 | −1.2357E+03 | 3.1165E+02 |
| A24: | 0.0000E+00 | 0.0000E+00 | 5.9221E+02 | −1.1442E+02 |

TABLE 4-continued

| Aspheric coefficient | | | |
| --- | --- | --- | --- |
| A26: | 0.0000E+00 | 0.0000E+00 | −1.8564E+02 | 2.8048E+01 |
| A28: | 0.0000E+00 | 0.0000E+00 | 3.4311E+01 | −4.1142E+00 |
| A30: | 0.0000E+00 | 0.0000E+00 | −2.8360E+00 | 2.7285E−01 |

In the second embodiment, an aspheric curve equation is expressed as that in the first embodiment. In addition, definitions of parameters in the following tables are the same as those in the first embodiment, and are not repeated herein.

TABLE 5

| IMH | 1.82 mm | CA1 | 0.44 mm |
| --- | --- | --- | --- |
| CRA | 34.19 | CA6 | 0.80 mm |
| TDP1 | 0.11 mm | CA8 | 1.37 mm |
| TDP4 | 0.02 mm | Y42C | 0.81 mm |
| TDP6 | 0.29 mm | ET3 | 0.19 mm |

Referring to Table 3 and Table 5, the following data may be calculated:

| Second embodiment | | | |
| --- | --- | --- | --- |
| TL*HFOV/(CA8*IMH) | 43.78°/mm | R2*R4/R1 | 19.57 mm |
| TL*(CT3/ET3) | 5.07 mm | TDP6/TDP4 | 12.72 |
| BFL/TDP1 | 8.26 | CA6/T34 | 10.20 |
| IMH/(EPD*CA1) | 4.60 mm⁻¹ | TL/BFL | 2.71 |
| (vd1 + vd3)/vd2 | 5.82 | f4/Y42C | −3.45 |
| CRA/EPD | 38.48°/mm | IMH*Tan(HFOV)/(BFL*CA6) | 2.40 mm⁻¹ |
| ΣAT/(T12 + T34) | 1.39 | TL/(Tan(HFOV)*IMH) | 1.41 |

Third Embodiment

Figure 3A:
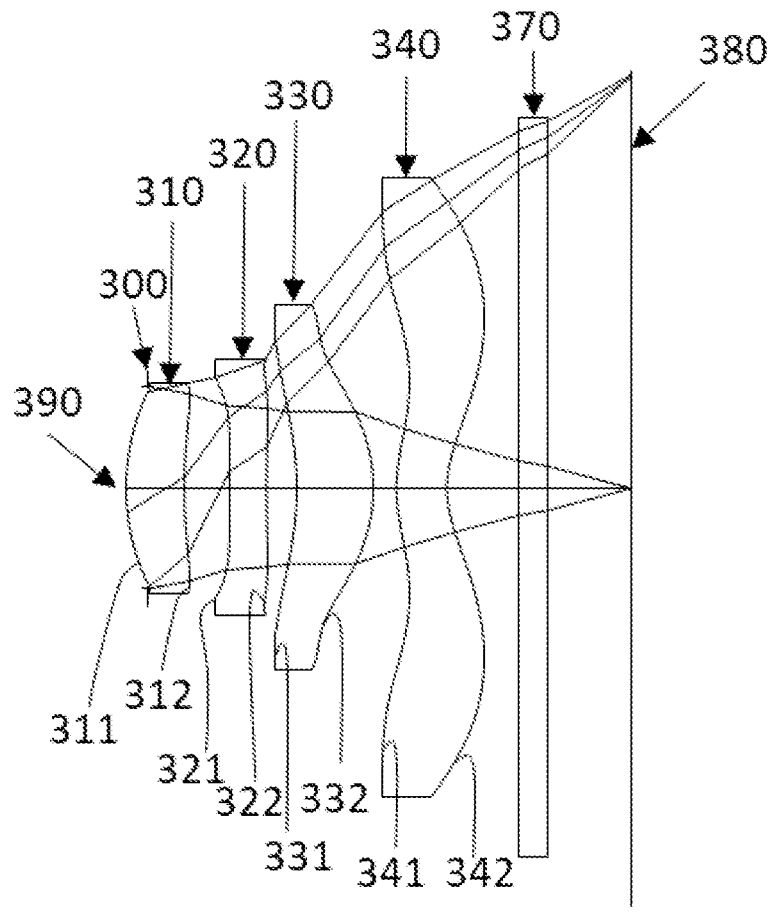
FIG. 3A is a schematic view of an optical lens assembly according to a third embodiment of the present disclosure of the present disclosure.
Figure 3B:
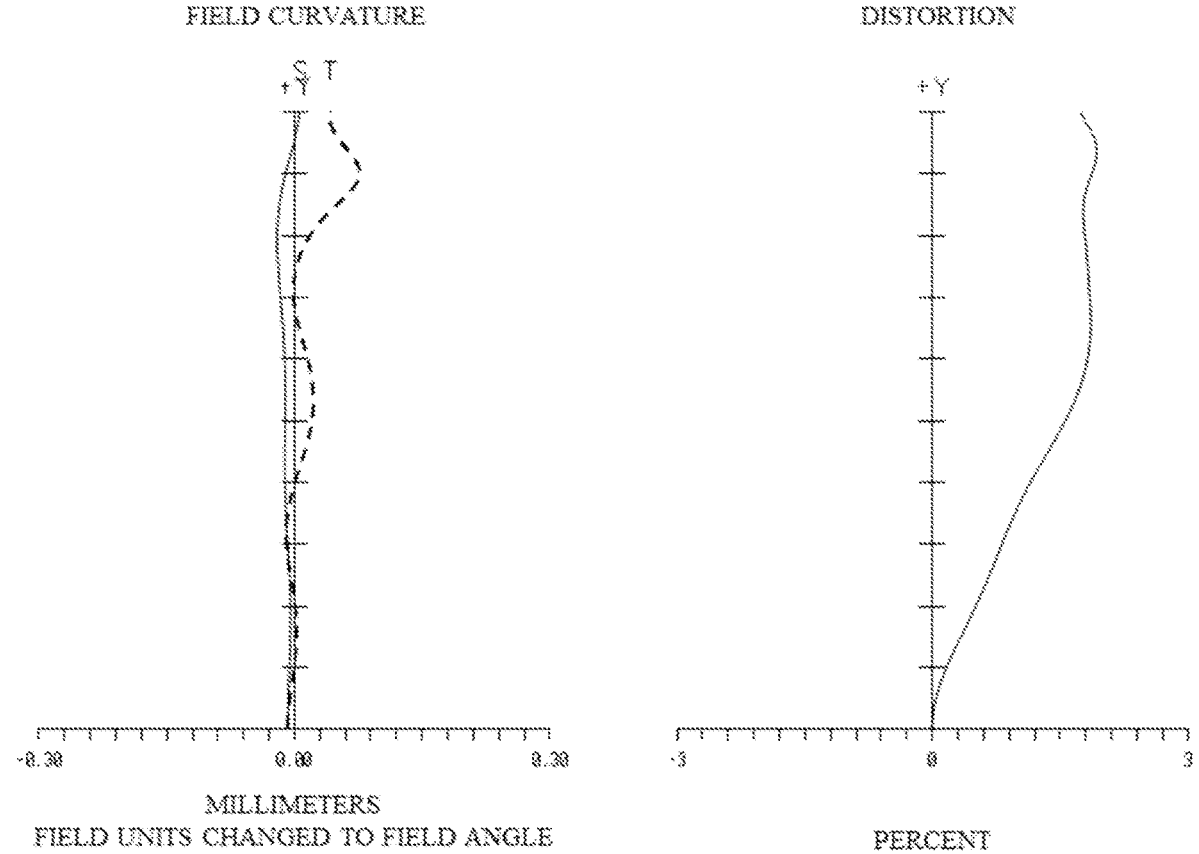
FIG. 3B shows a field curvature curves and a distortion curve of the optical lens assembly according to the third embodiment.

Refer to FIG. 3A and FIG. 3B. FIG. 3A is a schematic view of an optical lens assembly according to a third embodiment of the present disclosure, and FIG. 3B shows a field curvature curve and a distortion curve of an optical lens assembly according to a second embodiment. As can be seen from FIG. 3A, the optical lens assembly includes, in order from an object side to an image side: a stop 300, a first lens 310, a second lens 320, a third lens 330, a fourth lens 340, an IR-cut filter 370, and an image plane 380. A total quantity of lenses with refractive power in the optical lens assembly is four, but not limited thereto.

The first lens 310 with positive refractive power is made of a plastic material and includes an object-side surface 311 and an image-side surface 312, wherein the object-side surface 311 of the first lens 310 is convex near an optical axis 390, and the image-side surface 312 of the first lens 310 is concave near the optical axis 390. The object-side surface 311 and the image-side surface 312 are aspheric.

The second lens 320 with negative refractive power is made of a plastic material and includes an object-side surface 321 and an image-side surface 322, wherein the object-side surface 321 of the second lens 320 is convex near the optical axis 390, and the image-side surface 322 of the second lens 320 is concave near the optical axis 390. The object-side surface 321 and the image-side surface 322 are aspheric.

The third lens 330 with positive refractive power is made of a plastic material and includes an object-side surface 331 and an image-side surface 332, wherein the object-side surface 331 of the third lens 330 is concave near an optical axis 390, and the image-side surface 332 of the third lens 330 is convex near the optical axis 390. The object-side surface 331 and the image-side surface 332 are aspheric.

The fourth lens 340 with negative refractive power is made of a plastic material and includes an object-side surface 341 and an image-side surface 342, wherein the object-side surface 341 of the fourth lens 340 is convex near an optical axis 390, and the image-side surface 342 of the fourth lens 340 is concave near the optical axis 390. The object-side surface 341 and the image-side surface 342 are aspheric.

The JR-cut filter 370 is made of glass, and is disposed between the fourth lens 340 and the image plane 380 without affecting a focal length of the optical lens assembly. It can be understood that, the JR-cut filter 370 may also be formed on the surface of the above-mentioned lens. The JR-cut filter 370 may also be made of other materials.

Refer to Table 6, Table 7 and Table 8 below.

TABLE 6

| | | Third embodiment f (focal length) = 1.92 mm (millimeters), Fno (f-number) = 2.08, FOV (field of view) = 88.18° (degrees). | | | | | |
|---|---|---|---|---|---|---|---|
| Surface | | Curvature radius (mm) | Central thickness/gap (mm) | Material | Refractive index (nd) | Abbe number (vd) | Focal length (mm) |
| 0 | Object | Infinity | Infinity | | | | |
| 1 | Stop | Infinity | −0.110 | | | | |
| 2 | First lens | 0.901 (ASP) | 0.290 | Plastic | 1.54 | 55.99 | 2.50 |
| 3 | | 2.347 (ASP) | 0.223 | | | | |
| 4 | Second lens | 10.820 (ASP) | 0.184 | Plastic | 1.67 | 19.24 | −27.73 |
| 5 | | 6.818 (ASP) | 0.150 | | | | |
| 6 | Third lens | −1.156 (ASP) | 0.380 | Plastic | 1.54 | 55.99 | 2.59 |
| 7 | | −0.710 (ASP) | 0.113 | | | | |
| 8 | Fourth lens | 0.711 (ASP) | 0.250 | Plastic | 1.54 | 55.99 | −3.86 |
| 9 | | 0.466 (ASP) | 0.358 | | | | |
| 10 | IR-cut filter | Infinity | 0.145 | Glass | 1.52 | 64.17 | |
| 11 | | Infinity | 0.411 | | | | |
| 12 | Image Plane | Infinity | — | | | | |

Reference wavelength 555 nm

TABLE 7

| | Aspheric coefficient | | | |
|---|---|---|---|---|
| Surface | 2 | 3 | 4 | 5 |
| K: | −5.0280E+00 | −4.7502E+01 | 8.0231E+01 | −1.3339E+00 |
| A2: | 0.0000E+00 | 0.0000E+00 | 0.0000E+00 | 0.0000E+00 |
| A4: | 5.7787E−01 | 2.9398E−01 | −8.3720E−01 | −1.0315E−01 |
| A6: | 1.2142E+01 | −5.9956E+00 | 2.8252E+00 | 5.5124E−01 |
| A8: | −3.7343E+02 | 1.2254E+02 | −1.2437E+02 | −6.7201E+01 |
| A10: | 6.0274E+03 | −2.0892E+03 | 1.6607E+03 | 8.5891E+02 |
| A12: | −5.9433E+04 | 2.1410E+04 | −1.2974E+04 | −5.8310E+03 |
| A14: | 3.6465E+05 | −1.3497E+05 | 6.1738E+04 | 2.3690E+04 |
| A16: | −1.3601E+06 | 5.0968E+05 | −1.8181E+05 | −5.7797E+04 |
| A18: | 2.8237E+06 | −1.0601E+06 | 3.2025E+05 | 7.9036E+04 |
| A20: | −2.5045E+06 | 9.3536E+05 | −2.6559E+05 | −4.6414E+04 |
| A22: | 3.7479E+03 | −1.1420E+03 | −1.6188E+03 | −2.6407E+01 |
| A24: | 1.0982E+04 | 4.9022E+03 | 8.8256E+03 | −9.6217E+01 |
| A26: | −1.2222E+05 | −4.5071E+04 | 3.9656E+04 | −9.9948E+01 |
| A28: | −5.4294E+04 | 4.0523E+04 | 1.6696E+05 | −5.2574E+02 |
| A30: | 0.0000E+00 | 0.0000E+00 | 0.0000E+00 | 0.0000E+00 |

| Surfqace | 6 | 7 | 8 | 9 |
|---|---|---|---|---|
| K: | −1.2483E+01 | −1.0227E+00 | −1.0031E+00 | −1.0012E+00 |
| A2: | 0.0000E+00 | 0.0000E+00 | 0.0000E+00 | 0.0000E+00 |
| A4: | 1.3306E−01 | −4.2667E−01 | −3.1210E+00 | −3.8465E+00 |
| A6: | −1.5736E+00 | 1.4354E+00 | 8.4316E+00 | 1.3039E+01 |
| A8: | −1.7712E+01 | 1.7976E+01 | −1.6842E+01 | −4.0085E+01 |
| A10: | 3.2060E+02 | −1.9433E+02 | 8.9256E+00 | 1.0001E+02 |
| A12: | −1.8587E+03 | 8.7981E+02 | 7.5376E+01 | −1.9471E+02 |
| A14: | 5.5943E+03 | −2.0782E+03 | −2.9321E+02 | 2.9111E+02 |
| A16: | −9.4264E+03 | 2.6874E+03 | 5.8384E+02 | −3.3127E+02 |
| A18: | 8.4833E+03 | −1.8150E+03 | −7.5449E+02 | 2.8439E+02 |
| A20: | −3.2130E+03 | 5.0274E+02 | 6.7178E+02 | −1.8195E+02 |
| A22: | −4.0112E+01 | −2.5935E−01 | −4.1748E+02 | 8.5094E+01 |
| A24: | 0.0000E+00 | 0.0000E+00 | 1.7842E+02 | −2.8170E+01 |
| A26: | 0.0000E+00 | 0.0000E+00 | −5.0074E+01 | 6.2404E+00 |
| A28: | 0.0000E+00 | 0.0000E+00 | 8.3194E+00 | −8.2858E−01 |
| A30: | 0.0000E+00 | 0.0000E+00 | −6.2052E−01 | 4.9804E−02 |

In the third embodiment, an aspheric curve equation is expressed as that in the first embodiment. In addition, definitions of parameters in the following tables are the same as those in the first embodiment, and are not repeated herein.

TABLE 8

| IMH | 1.9 mm | CA1 | 0.46 mm |
|------|--------|------|---------|
| CRA | 34.24° | CA6 | 0.85 mm |
| TDP1 | 0.12 mm | CA8 | 1.43 mm |
| TDP4 | 0.00 mm | Y42C | 0.79 mm |
| TDP6 | 0.31 mm | ET3 | 0.18 mm |

Referring to Table 5 and Table 6, the following data may be calculated:

| Third embodiment | | | |
|------------------|--------|-------------------------|--------------|
| TL*HFOV/(CA8*IMH) | 40.57°/mm | R2*R4/R1 | 17.77 mm |
| TL*(CT3/ET3) | 5.31 mm | TDP6/TDP4 | 67.09 |
| BFL/TDP1 | 7.45 | CA6/T34 | 7.49 |
| IMH/(EPD*CA1) | 4.44 mm⁻¹ | TL/BFL | 2.74 |
| (vd1 + vd3)/vd2 | 5.82 | f4/Y42C | −4.91 |
| CRA/EPD | 37.01°/mm | IMH*Tan(HFOV)/(BFL*CA6) | 2.38 mm⁻¹ |
| ΣAT/(T12 + T34) | 1.45 | TL/(Tan(HFOV)*IMH) | 1.36 |

Fourth Embodiment

Figure 4A:
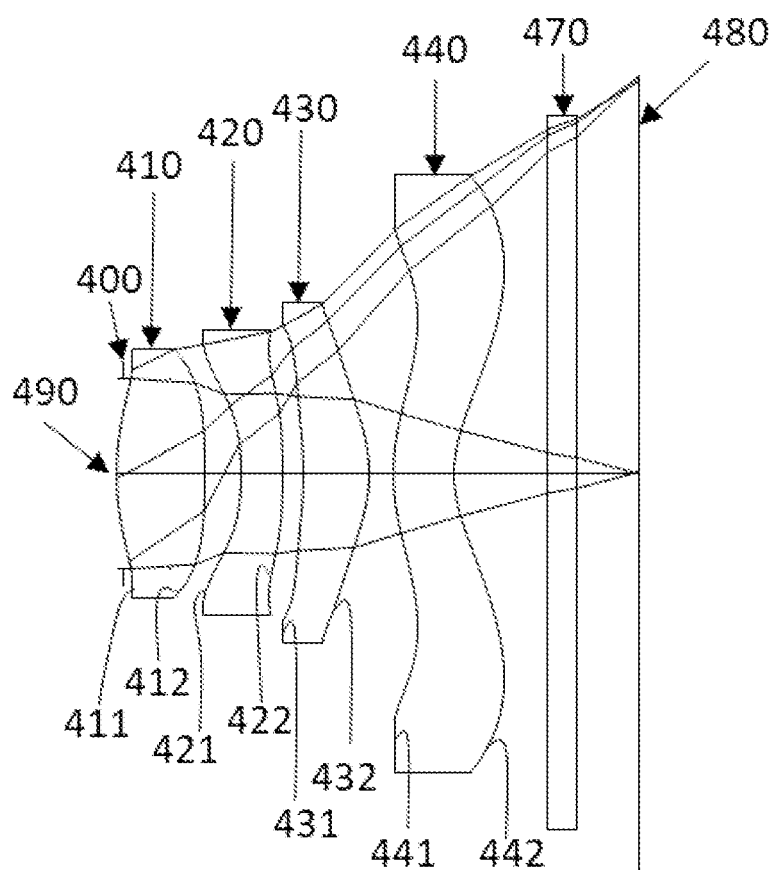
FIG. 4A is a schematic view of an optical lens assembly according to a fourth embodiment of the present disclosure of the present disclosure.
Figure 4B:
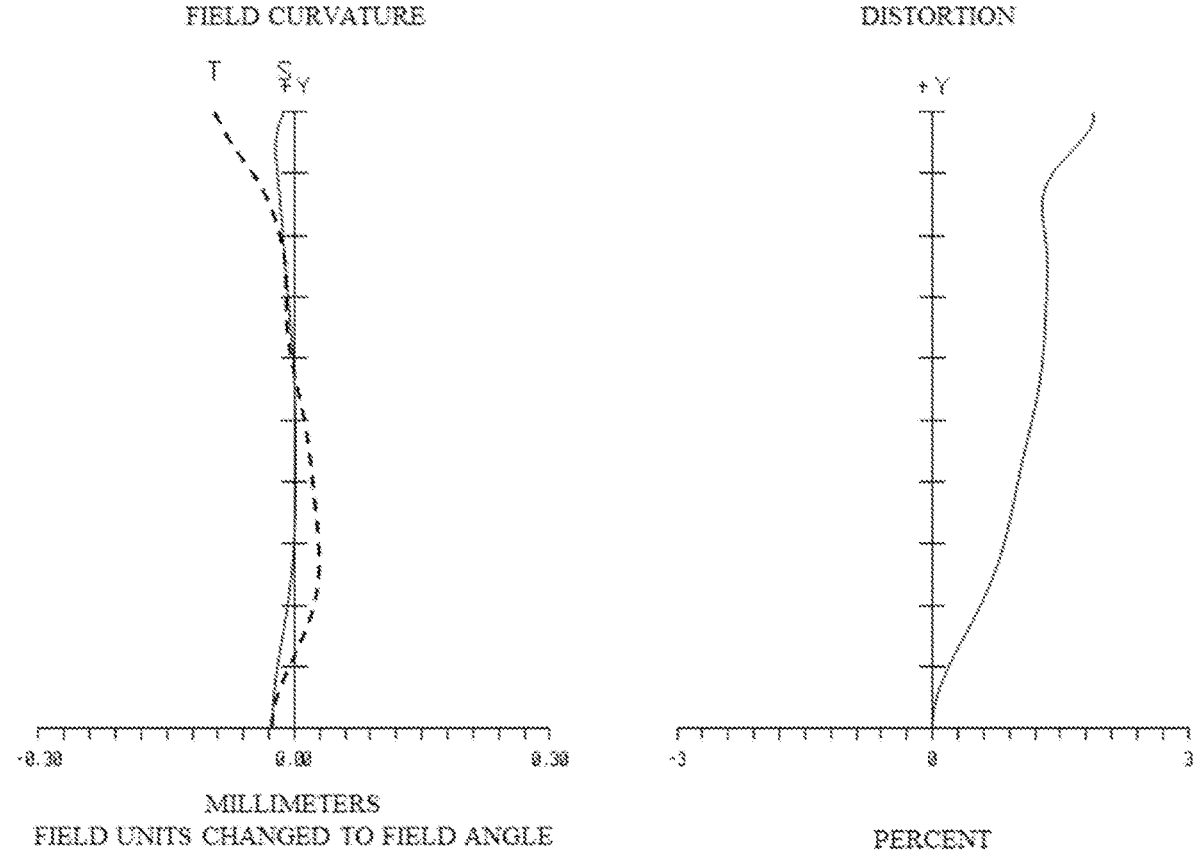
FIG. 4B shows a field curvature curves and a distortion curve of the optical lens assembly according to the fourth embodiment.

Refer to FIG. 4A and FIG. 4B. FIG. 4A is a schematic view of an optical lens assembly according to a fourth embodiment of the present disclosure, and FIG. 4B shows a field curvature curve and a distortion curve of an optical lens assembly according to a second embodiment. As can be seen from FIG. 4A, the optical lens assembly includes, in order from an object side to an image side: a stop 400, a first lens 410, a second lens 420, a third lens 430, a fourth lens 440, an IR-cut filter 470, and an image plane 480. A total quantity of lenses with refractive power in the optical lens assembly is four, but not limited thereto.

The first lens 410 with positive refractive power is made of a plastic material and includes an object-side surface 411 and an image-side surface 412, wherein the object-side surface 411 of the first lens 410 is convex near an optical axis 490, and the image-side surface 412 of the first lens 410 is convex near the optical axis 490. The object-side surface 411 and the image-side surface 412 are aspheric.

The second lens 420 with negative refractive power is made of a plastic material and includes an object-side surface 421 and an image-side surface 422, wherein the object-side surface 421 of the second lens 420 is concave near the optical axis 490, and the image-side surface 422 of the second lens 420 is convex near the optical axis 490. The object-side surface 421 and the image-side surface 422 are aspheric.

The third lens 430 with positive refractive power is made of a plastic material and includes an object-side surface 431 and an image-side surface 432, wherein the object-side surface 431 of the third lens 430 is concave near an optical axis 490, and the image-side surface 432 of the third lens 430 is convex near the optical axis 490. The object-side surface 431 and the image-side surface 432 are aspheric.

The fourth lens 440 with negative refractive power is made of a plastic material and includes an object-side surface 441 and an image-side surface 442, wherein the object-side surface 441 of the fourth lens 440 is convex near an optical axis 490, and the image-side surface 442 of the fourth lens 440 is concave near the optical axis 490. The object-side surface 441 and the image-side surface 442 are aspheric.

The IR-cut filter 470 is made of glass, and is disposed between the fourth lens 440 and the image plane 480 without affecting a focal length of the optical lens assembly. It can be understood that, the IR-cut filter 470 may also be formed on the surface of the above-mentioned lens. The IR-cut filter 470 may also be made of other materials.

Refer to Table 9, Table 10 and Table 11 below.

TABLE 9

| | | Fourth embodiment | | | | | |
|---|---|---|---|---|---|---|---|
| | | f (focal length) = 1.82 mm (millimeters), Fno (f-number) = 2.09, FOV (field of view) = 88.13° (degrees). | | | | | |
| Surface | | Curvature radius (mm) | Central thickness/gap (mm) | Material | Refractive index (nd) | Abbe number (vd) | Focal length (mm) |
| 0 | Object | Infinity | Infinity | | | | |
| 1 | Stop | Infinity | −0.030 | | | | |
| 2 | First lens | 1.227 (ASP) | 0.432 | Plastic | 1.54 | 55.99 | 1.87 |
| 3 | | −5.295 (ASP) | 0.174 | | | | |
| 4 | Second lens | −1.250 (ASP) | 0.206 | Plastic | 1.64 | 23.97 | −3.56 |
| 5 | | −2.947 (ASP) | 0.099 | | | | |
| 6 | Third lens | −1.348 (ASP) | 0.322 | Plastic | 1.54 | 55.99 | 1.77 |
| 7 | | −0.611 (ASP) | 0.123 | | | | |
| 8 | Fourth lens | 0.943 (ASP) | 0.297 | Plastic | 1.54 | 55.99 | −2.67 |
| 9 | | 0.509 (ASP) | 0.456 | | | | |

TABLE 9-continued

| | | Fourth embodiment f (focal length) = 1.82 mm (millimeters), Fno (f-number) = 2.09, FOV (field of view) = 88.13° (degrees). | | | | | |
|---|---|---|---|---|---|---|---|
| Surface | | Curvature radius (mm) | Central thickness/gap (mm) | Material | Refractive index (nd) | Abbe number (vd) | Focal length (mm) |
| 10 | IR-cut filter | Infinity | 0.145 | Glass | 1.52 | 64.17 | |
| 11 | | Infinity | 0.300 | | | | |
| 12 | Image Plane | Infinity | — | | | | |

Reference wavelength 555 nm

TABLE 10

| | | Aspheric coefficient | | |
|---|---|---|---|---|
| Surface | 2 | 3 | 4 | 5 |
| K: | −1.7677E+01 | 1.6978E+01 | 9.3925E−01 | −4.7379E+02 |
| A2: | 0.0000E+00 | 0.0000E+00 | 0.0000E+00 | 0.0000E+00 |
| A4: | 9.9430E−01 | −1.2031E+00 | −2.4454E+00 | −1.9149E+00 |
| A6: | −6.2899E+00 | 1.4692E+00 | 1.9420E+00 | 4.1214E+00 |
| A8: | 3.0346E+01 | −9.8652E+00 | 4.8980E+01 | 6.1988E+00 |
| A10: | −1.3278E+02 | −9.5128E+00 | −1.5291E+02 | −1.7383E+01 |
| A12: | 1.3823E+02 | 3.1850E+02 | 1.3321E+02 | −2.3826E−01 |
| A14: | 1.1516E+03 | −1.1052E+03 | 4.3760E+01 | 1.1852E+01 |
| A16: | −4.5692E+03 | 1.3239E+03 | −1.1716E+02 | 1.2013E+01 |
| A18: | 7.2748E+02 | −7.5494E+02 | 1.6239E+02 | 1.1609E+01 |
| A20: | 1.4700E+04 | 3.6408E+02 | 1.5441E+02 | −6.9701E+01 |
| A22: | −8.7349E+03 | 5.3602E+02 | −6.1837E+02 | −9.7679E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

| Surface | 6 | 7 | 8 | 9 |
|---|---|---|---|---|
| K: | −3.8532E+01 | −1.1165E+00 | −4.2380E+00 | −3.8138E+00 |
| A2: | 0.0000E+00 | 0.0000E+00 | 0.0000E+00 | 0.0000E+00 |
| A4: | 7.8128E−01 | 1.8266E+00 | −2.0660E−01 | −3.2016E−01 |
| A6: | −4.8461E+00 | −3.8261E+00 | −1.2578E+00 | 1.2003E−01 |
| A8: | 1.8136E+01 | 5.7032E+00 | 4.0927E+00 | 1.8130E−01 |
| A10: | −3.8729E+01 | −4.3867E+00 | −6.4212E+00 | −3.6559E−01 |
| A12: | 1.3797E+01 | −5.4906E+00 | 5.4653E+00 | 2.6538E−01 |
| A14: | 5.7029E+01 | 1.0154E+01 | −2.3804E+00 | −9.1917E−02 |
| A16: | −8.0336E+00 | −7.6711E−01 | 4.1610E−01 | 1.3423E−02 |
| A18: | −1.3888E+02 | −2.1179E−01 | 3.6928E−03 | −2.8542E−04 |
| A20: | 3.8977E+01 | 1.8809E+00 | 9.4193E−04 | −1.2162E−04 |
| A22: | 1.1021E+02 | −2.7567E+00 | −1.7695E−03 | 4.4872E−05 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

In the Fourth embodiment, an aspheric curve equation is expressed as that in the first embodiment. In addition, definitions of parameters in the following tables are the same as those in the first embodiment, and are not repeated herein.

TABLE 11

| | | | |
|---|---|---|---|
| IMH | 1.81 mm | CA1 | 0.47 mm |
| CRA | 35.10° | CA6 | 0.78 mm |
| TDP1 | 0.07 mm | CA8 | 1.37 mm |
| TDP4 | 0.06 mm | Y42C | 0.94 mm |
| TDP6 | 0.23 mm | ET3 | 0.19 mm |

Referring to Table 9 and Table 11, the following data may be calculated:

| Fourth embodiment | | | |
|---|---|---|---|
| TL*HFOV/ (CA8*IMH) | 45.32°/mm | R2*R4/R1 | 12.72 mm |
| TL*(CT3/ET3) | 4.24 mm | TDP6/TDP4 | 3.73 |
| BFL/TDP1 | 12.77 | CA6/T34 | 6.34 |
| IMH/(EPD*CA1) | 4.41 mm$^{-1}$ | TL/BFL | 2.83 |
| (vd1 + vd3)/vd2 | 4.67 | f4/Y42C | −2.86 |
| CRA/EPD | 40.41°/mm | IMH*Tan(HFOV)/ (BFL*CA6) | 2.50 mm$^{-1}$ |
| ΣAT/(T12 + T34) | 1.34 | TL/(Tan(HFOV)*IMH) | 1.45 |

Fifth Embodiment

Figure 5A:
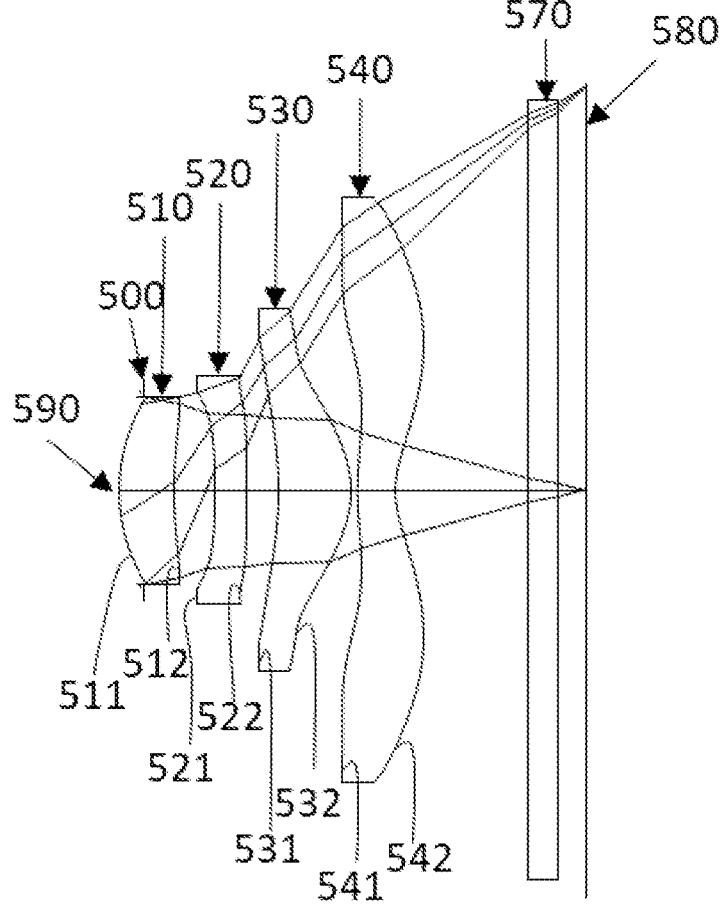
FIG. 5A is a schematic view of an optical lens assembly according to a fifth embodiment of the present disclosure of the present disclosure.
Figure 5B:
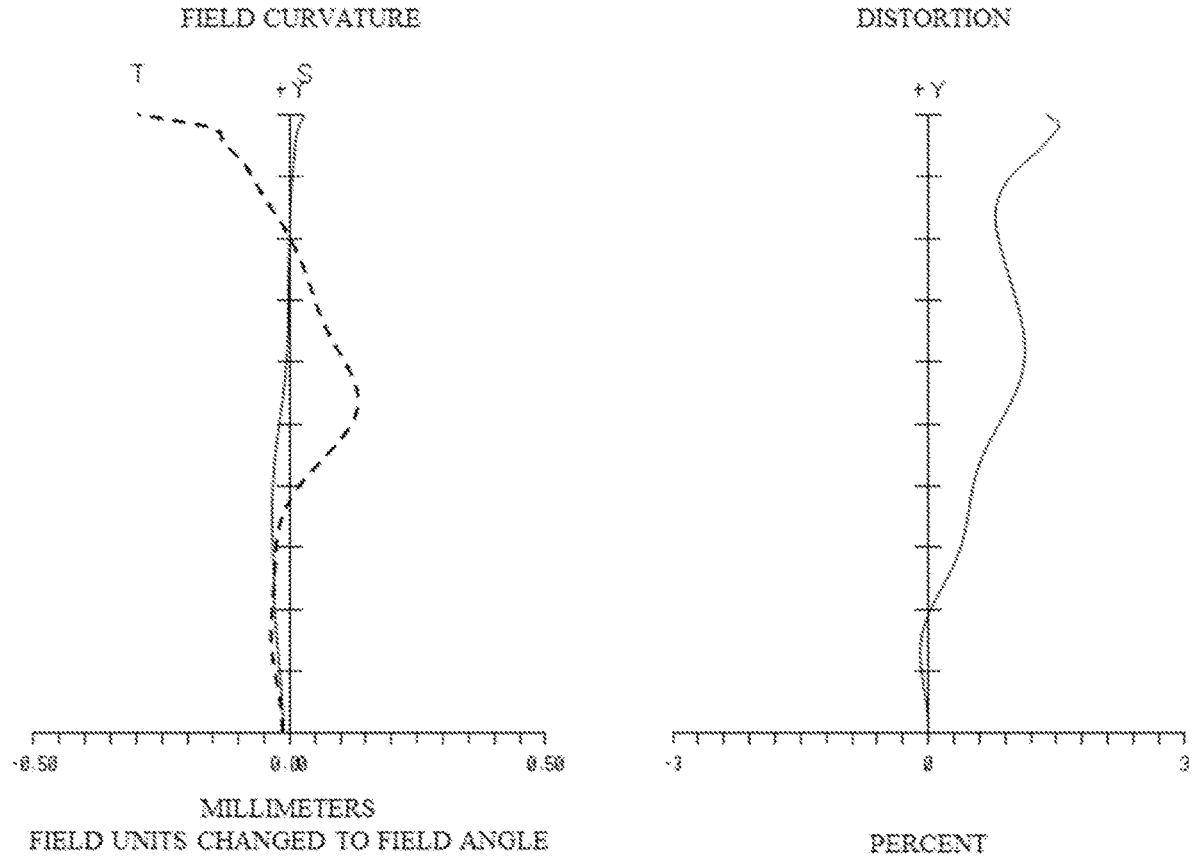
FIG. 5B shows a field curvature curves and a distortion curve of the optical lens assembly according to the fifth embodiment.

Refer to FIG. 5A and FIG. 5B. FIG. 5A is a schematic view of an optical lens assembly according to a fifth embodiment of the present disclosure, and FIG. 5B shows a field curvature curve and a distortion curve of an optical lens assembly according to a second embodiment. As can be seen from FIG. 5A, the optical lens assembly includes, in order from an object side to an image side: a stop 500, a first lens 510, a second lens 520, a third lens 530, a fourth lens 540, an IR-cut filter 570, and an image plane 580. A total quantity of lenses with refractive power in the optical lens assembly is four, but not limited thereto.

The first lens 510 with positive refractive power is made of a plastic material and includes an object-side surface 511 and an image-side surface 512, wherein the object-side surface 511 of the first lens 510 is convex near an optical axis 590, and the image-side surface 512 of the first lens 510 is concave near the optical axis 590. The object-side surface 511 and the image-side surface 512 are aspheric.

The second lens 520 with negative refractive power is made of a plastic material and includes an object-side surface 521 and an image-side surface 522, wherein the object-side surface 521 of the second lens 520 is concave near the optical axis 590, and the image-side surface 522 of the second lens 520 is concave near the optical axis 590. The object-side surface 521 and the image-side surface 522 are aspheric.

The third lens 530 with positive refractive power is made of a plastic material and includes an object-side surface 531 and an image-side surface 532, wherein the object-side surface 531 of the third lens 530 is concave near an optical axis 590, and the image-side surface 532 of the third lens 530 is convex near the optical axis 590. The object-side surface 531 and the image-side surface 532 are aspheric.

The fourth lens 540 with negative refractive power is made of plastic material and includes an object-side surface 541 and an image-side surface 542, wherein the object-side surface 541 of the fourth lens 540 is convex near an optical axis 590, and the image-side surface 542 of the fourth lens 540 is concave near the optical axis 590. The object-side surface 541 and the image-side surface 542 are aspheric.

The IR-cut filter 570 is made of glass, and is disposed between the fourth lens 540 and the image plane 580 without affecting a focal length of the optical lens assembly. It can be understood that, the JR-cut filter 570 may also be formed on the surface of the above-mentioned lens. The JR-cut filter 570 may also be made of other materials.

Refer to Table 12, Table 13 and Table 14 below.

TABLE 12

Fifth embodiment
f (focal length) = 1.83 mm (millimeters), Fno (f-number) = 2.07, FOV (field of view) = 90.89° (degrees).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 600.000 | | | | |
| 1 | Stop | Infinity | −0.116 | | | | |
| 2 | First lens | 0.788 (ASP) | 0.273 | Plastic | 1.54 | 55.99 | 2.19 |
| 3 | | 2.025 (ASP) | 0.200 | | | | |
| 4 | Second lens | −4.854 (ASP) | 0.160 | Plastic | 1.66 | 20.37 | −6.53 |
| 5 | | 42.989 (ASP) | 0.168 | | | | |
| 6 | Third lens | −1.661 (ASP) | 0.359 | Plastic | 1.54 | 55.99 | 0.99 |
| 7 | | −0.441 (ASP) | 0.036 | | | | |
| 8 | Fourth lens | 1.167 (ASP) | 0.187 | Plastic | 1.54 | 55.99 | −1.15 |
| 9 | | 0.386 (ASP) | 0.674 | | | | |
| 10 | IR-cut filter | Infinity | 0.145 | Glass | 1.52 | 64.17 | |
| 11 | | Infinity | 0.140 | | | | |
| 12 | Image Plane | Infinity | — | | | | |

Reference wavelength 555 nm

TABLE 13

Aspheric coefficient

| Surface | 2 | 3 | 4 | 5 |
|---|---|---|---|---|
| K: | −6.5239E+00 | −5.4880E+01 | 9.6744E+01 | 3.0068E+02 |
| A2: | 0.0000E+00 | 0.0000E+00 | 0.0000E+00 | 0.0000E+00 |
| A4: | −3.7936E+00 | −1.7223E+00 | 2.7424E+00 | −9.3146E−01 |
| A6: | 5.2049E+02 | 2.6924E+02 | −3.4007E+02 | 2.6752E+01 |
| A8: | −2.8538E+04 | −1.7191E+04 | 1.7172E+04 | −1.4333E+03 |
| A10: | 9.8113E+05 | 6.6104E+05 | −5.6209E+05 | 4.7904E+04 |
| A12: | −2.2747E+07 | −1.6774E+07 | 1.2625E+07 | −1.0672E+06 |
| A14: | 3.7044E+08 | 2.9380E+08 | −2.0186E+08 | 1.6362E+07 |
| A16: | −4.3427E+09 | −3.6484E+09 | 2.3442E+09 | −1.7663E+08 |
| A18: | 3.7105E+10 | 3.2569E+10 | −1.9940E+10 | 1.3603E+09 |
| A20: | −2.3137E+11 | −2.0955E+11 | 1.2398E+11 | −7.4934E+09 |

TABLE 13-continued

| | | Aspheric coefficient | | |
|---|---|---|---|
| A22: | 1.0418E+12 | 9.6257E+11 | −5.5604E+11 | 2.9258E+10 |
| A24: | −3.2989E+12 | −3.0775E+12 | 1.7484E+12 | −7.8962E+10 |
| A26: | 6.9680E+12 | 6.5033E+12 | −3.6515E+12 | 1.3991E+11 |
| A28: | −8.8132E+12 | −8.1627E+12 | 4.5421E+12 | −1.4626E+11 |
| A30: | 5.0479E+12 | 4.6070E+12 | −2.5433E+12 | 6.8299E+10 |

| Surface | 6 | 7 | 8 | 9 |
|---|---|---|---|---|
| K: | 3.4671E+00 | −2.1123E+00 | −5.2186E+01 | −5.1046E+00 |
| A2: | 0.0000E+00 | 0.0000E+00 | 0.0000E+00 | 0.0000E+00 |
| A4: | −9.6664E−01 | 4.3682E−01 | −7.5331E−02 | −1.3155E+00 |
| A6: | 7.0662E+01 | 2.4804E+01 | −9.8679E+00 | 4.1660E+00 |
| A8: | −1.7605E+03 | −6.5885E+02 | 6.7698E+01 | −1.2223E+01 |
| A10: | 2.7326E+04 | 8.0460E+03 | −2.6195E+02 | 3.0958E+01 |
| A12: | −2.8768E+05 | −6.0960E+04 | 6.7036E+02 | −6.6988E+01 |
| A14: | 2.1361E+06 | 3.1389E+05 | −1.1632E+03 | 1.2175E+02 |
| A16: | −1.1409E+07 | −1.1407E+06 | 1.3584E+03 | −1.8090E+02 |
| A18: | 4.4205E+07 | 2.9813E+06 | −1.0147E+03 | 2.1267E+02 |
| A20: | −1.2412E+08 | −5.6351E+06 | 3.9309E+02 | −1.9114E+02 |
| A22: | 2.4950E+08 | 7.6444E+06 | 3.8138E+01 | 1.2668E+02 |
| A24: | −3.4943E+08 | −7.2594E+06 | −1.3280E+02 | −5.9291E+01 |
| A26: | 3.2339E+08 | 4.5809E+06 | 7.0344E+01 | 1.8401E+01 |
| A28: | −1.7758E+08 | −1.7246E+06 | −1.7396E+01 | −3.3791E+00 |
| A30: | 4.3776E+07 | 2.9291E+05 | 1.7464E+00 | 2.7683E−01 |

In the fifth embodiment, an aspheric curve equation is expressed as a in the first embodiment. In addition, definitions of parameters in the following tables are the same as those in the first embodiment, and are not repeated herein.

TABLE 14

| IMH | 1.90 mm | CA1 | 0.44 mm |
|---|---|---|---|
| CRA | 35.16° | CA6 | 0.85 mm |
| TDP1 | 0.13 mm | CA8 | 1.37 mm |
| TDP4 | 0.03 mm | Y42C | 0.69 mm |
| TDP6 | 0.31 mm | ET3 | 0.15 mm |

Referring to Table 12 an Table 14 the following data may be calculated:

| | | Fifth embodiment | |
|---|---|---|---|
| TL*HFOV/ (CA8*IMH) | 40.87°/mm | R2*R4/R1 | 110.43 mm |
| TL*(CT3/ET3) | 5.61 mm | TDP6/TDP4 | 12.21 |
| BFL/TDP1 | 7.66 | CA6/T34 | 23.56 |
| IMH/(EPD*CA1) | 4.89 mm$^{-1}$ | TL/BFL | 2.44 |
| (vd1 + vd3)/vd2 | 5.50 | f4/Y42C | −1.68 |
| CRA/EPD | 39.88°/mm | IMH*Tan(HFOV)/ (BFL*CA6) | 2.37 mm$^{-1}$ |
| ΣAT/(T12 + T34) | 1.71 | TL/ (Tan(HFOV)*IMH) | 1.21 |

Sixth Embodiment

Figure 6A:
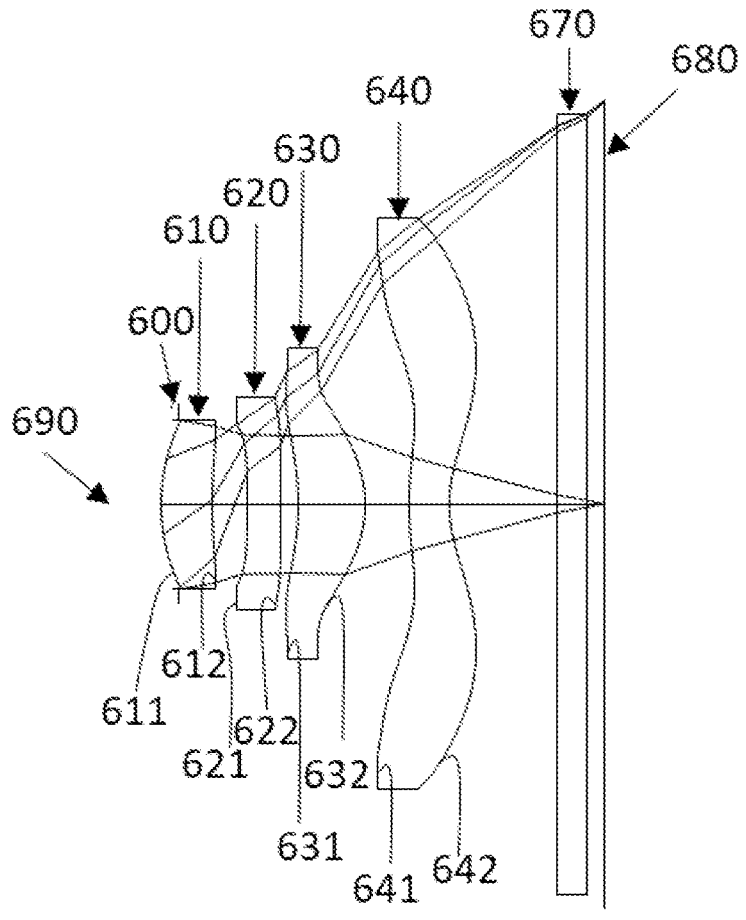
FIG. 6A is a schematic view of an optical lens assembly according to a fifth embodiment of the present disclosure of the present disclosure.
Figure 6B:
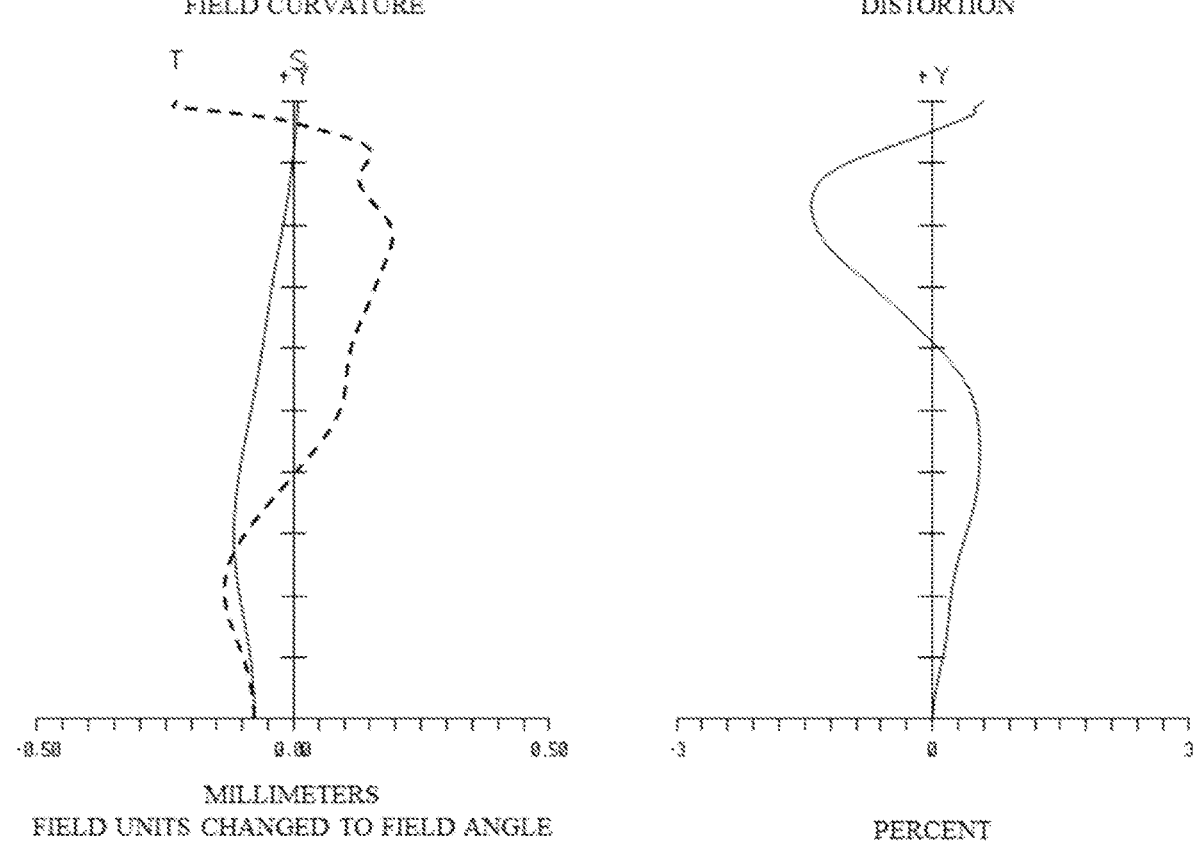
FIG. 6B shows a field curvature curves and a distortion curve of the optical lens assembly according to the fifth embodiment.

Refer to FIG. 6A and FIG. 6B. FIG. 6A is a schematic view of an optical lens assembly according to a sixth embodiment of the present disclosure, and FIG. 6B shows a field curvature curve and a distortion curve of an optical lens assembly according to a second embodiment. As can be seen from FIG. 6A, the optical lens assembly includes, in order from an object side to an image side: a stop 600, a first lens 610, a second lens 620, a third lens 630, a fourth lens 640, an IR-cut filter 670, and an image plane 680. A total quantity of lenses with refractive power in the optical lens assembly is four, but not limited thereto.

The first lens 610 with positive refractive power is made of a plastic material and includes an object-side surface 611 and an image-side surface 612, wherein the object-side surface 611 of the first lens 610 is convex near an optical axis 690, and the image-side surface 612 of the first lens 610 is concave near the optical axis 690. The object-side surface 611 and the image-side surface 612 are aspheric.

The second lens 620 with negative refractive power is made of a plastic material and includes an object-side surface 621 and an image-side surface 622, wherein the object-side surface 621 of the second lens 620 is concave near the optical axis 690, and the image-side surface 622 of the second lens 620 is convex near the optical axis 690. The object-side surface 621 and the image-side surface 622 are aspheric.

The third lens 630 with positive refractive power is made of a plastic material and includes an object-side surface 631 and an image-side surface 632, wherein the object-side surface 631 of the third lens 630 is concave near an optical axis 690, and the image-side surface 632 of the third lens 630 is convex near the optical axis 690. The object-side surface 631 and the image-side surface 632 are aspheric.

The fourth lens 640 with negative refractive power is made of a plastic material and includes an object-side surface 641 and an image-side surface 642, wherein the object-side surface 641 of the fourth lens 640 is convex near an optical axis 690, and the image-side surface 642 of the fourth lens 640 is concave near the optical axis 690. The object-side surface 641 and the image-side surface 642 are aspheric.

The IR-cut filter 670 is made of glass, and is disposed between the fourth lens 640 and the image plane 680 without affecting a focal length of the optical lens assembly. It can be understood that, the IR-cut filter 670 may also be formed on the surface of the above-mentioned lens. The IR-cut filter 670 may also be made of other materials.

Refer to Table 15, Table 16 and Table 17 below.

TABLE 15

Sixth embodiment
f (focal length) = 1.64 mm (millimeters), Fno (f-number) =
2.07, FOV (field of view) = 95.35° (degrees).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | Infinity | | | | |
| 1 | Stop | Infinity | −0.089 | | | | |
| 2 | First lens | 0.768 (ASP) | 0.259 | Plastic | 1.54 | 55.99 | 1.98 |
| 3 | | 2.336 (ASP) | 0.179 | | | | |
| 4 | Second lens | −5.253 (ASP) | 0.164 | Plastic | 1.67 | 19.24 | −7.82 |
| 5 | | −644.926 (ASP) | 0.093 | | | | |
| 6 | Third lens | −1.015 (ASP) | 0.336 | Plastic | 1.54 | 55.99 | 1.44 |
| 7 | | −0.495 (ASP) | 0.217 | | | | |
| 8 | Fourth lens | 1.456 (ASP) | 0.206 | Plastic | 1.54 | 55.99 | −1.81 |
| 9 | | 0.560 (ASP) | 0.548 | | | | |
| 10 | IR-cut filter | Infinity | 0.145 | Glass | 1.52 | 64.17 | |
| 11 | | Infinity | 0.090 | | | | |
| 12 | Image Plane | Infinity | — | | | | |

Reference wavelength 555 nm

TABLE 16

Aspheric coefficient

| Surface | 2 | 3 | 4 | 5 |
|---|---|---|---|---|
| K: | −9.5318E−01 | −6.0913E+01 | 9.5778E+01 | 3.0010E+02 |
| A2: | 0.0000E+00 | 0.0000E+00 | 0.0000E+00 | 0.0000E+00 |
| A4: | −1.0724E+01 | 3.8228E−01 | 8.2896E+00 | 1.2308E+00 |
| A6: | 1.2933E+03 | 3.1755E+01 | −1.0245E+03 | −6.4717E+01 |
| A8: | −8.8551E+04 | −6.6372E+03 | 6.3812E+04 | 1.7285E+03 |
| A10: | 3.8720E+06 | 4.7448E+05 | −2.5722E+06 | −3.1422E+04 |
| A12: | −1.1468E+08 | −1.9111E+07 | 7.0436E+07 | 3.3820E+05 |
| A14: | 2.3880E+09 | 4.8988E+08 | −1.3571E+09 | −1.4877E+06 |
| A16: | −3.5775E+10 | −8.4798E+09 | 1.8798E+10 | −1.1418E+07 |
| A18: | 3.9014E+11 | 1.0219E+11 | −1.8922E+11 | 2.3649E+08 |
| A20: | −3.1008E+12 | −8.6800E+11 | 1.3849E+12 | −1.8846E+09 |
| A22: | 1.7777E+13 | 5.1778E+12 | −7.2901E+12 | 8.9859E+09 |
| A24: | −7.1617E+13 | −2.1230E+13 | 2.6879E+13 | −2.7406E+10 |
| A26: | 1.9244E+14 | 5.6970E+13 | −6.5867E+13 | 5.2558E+10 |
| A28: | −3.0980E+14 | −9.0082E+13 | 9.6343E+13 | −5.7888E+10 |
| A30: | 2.2610E+14 | 6.3626E+13 | −6.3643E+13 | 2.7955E+10 |

| Surface | 6 | 7 | 8 | 9 |
|---|---|---|---|---|
| K: | −1.5288E+00 | −6.7454E+00 | −3.5558E−01 | −3.9837E+00 |
| A2: | 0.0000E+00 | 0.0000E+00 | 0.0000E+00 | 0.0000E+00 |
| A4: | 2.6332E−01 | −4.3313E+00 | −3.6782E−01 | −2.0066E−01 |
| A6: | 5.5296E+01 | 4.0096E+01 | −1.3149E+01 | −8.4899E+00 |
| A8: | −1.7839E+03 | −2.2075E+02 | 9.9522E+01 | 6.5638E+01 |
| A10: | 3.1513E+04 | −1.7593E+03 | −4.6020E+02 | −2.8798E+02 |
| A12: | −3.6493E+05 | 4.9556E+04 | 1.5356E+03 | 8.5090E+02 |
| A14: | 2.9744E+06 | −4.9791E+05 | −3.7908E+03 | −1.7809E+03 |
| A16: | −1.7557E+07 | 2.9867E+06 | 6.9403E+03 | 2.6994E+03 |
| A18: | 7.5989E+07 | −1.1777E+07 | −9.3887E+03 | −2.9903E+03 |
| A20: | −2.4183E+08 | 3.1453E+07 | 9.3043E+03 | 2.4182E+03 |
| A22: | 5.6175E+08 | −5.7014E+07 | −6.6468E+03 | −1.4101E+03 |
| A24: | −9.3131E+08 | 6.8648E+07 | 3.3241E+03 | 5.7671E+02 |
| A26: | 1.0498E+09 | −5.1974E+07 | −1.1028E+03 | −1.5683E+02 |
| A28: | −7.2501E+08 | 2.1948E+07 | 2.1781E+02 | 2.5447E+01 |
| A30: | 2.3251E+08 | −3.7845E+06 | −1.9376E+01 | −1.8630E+00 |

In the sixth embodiment, an aspheric curve equation is expressed as that in the first embodiment. In addition, definitions of parameters in the following tables are the same as those in the first embodiment, and are not repeated herein.

TABLE 17

| IMH | 1.90 mm | CA1 | 0.40 mm |
|---|---|---|---|
| CRA | 34.98° | CA6 | 0.73 mm |
| TDP1 | 0.10 mm | CA8 | 1.34 mm |
| TDP4 | 0.03 mm | Y42C | 0.65 mm |
| TDP6 | 0.24 mm | ET3 | 0.16 mm |

Referring to Table 15 and Table 17, the following data may be calculated:

| Sixth embodiment | | | |
|---|---|---|---|
| TL*HFOV/ (CA8*IMH) | 41.81°/mm | R2*R4/R1 | −1961.70 mm |
| TL*(CT3/ET3) | 4.84 mm | TDP6/TDP4 | 8.30 |
| BFL/TDP1 | 7.95 | CA6/T34 | 3.37 |
| IMH/ (EPD*CA1) | 6.06 mm$^{-1}$ | TL/BFL | 2.86 |
| (vd1 + vd3)/vd2 | 5.82 | f4/Y42C | −2.81 |
| CRA/EPD | 44.18°/mm | IMH*Tan(HFOV)/ (BFL*CA6) | 3.65 mm$^{-1}$ |
| ΣAT/(T12 + T34) | 1.24 | TL/ (Tan(HFOV)*IMH) | 1.07 |

Seventh Embodiment

Refer to FIG. 7A and FIG. 7B. FIG. 7A is a schematic view of an optical lens assembly according to a seventh embodiment of the present disclosure, and FIG. 7B shows a field curvature curve and a distortion curve of an optical lens assembly according to a second embodiment. As can be seen from FIG. 7A, the optical lens assembly includes, in order from an object side to an image side: a stop 700, a first lens 710, a second lens 720, a third lens 730, a fourth lens 740, an IR-cut filter 770, and an image plane 780. A total quantity of lenses with refractive power in the optical lens assembly is four, but not limited thereto.

The first lens 710 with positive refractive power is made of a plastic material and includes an object-side surface 711 and an image-side surface 712, wherein the object-side surface 711 of the first lens 710 is convex near an optical axis 790, and the image-side surface 712 of the first lens 710 is concave near the optical axis 790. The object-side surface 711 and the image-side surface 712 are aspheric.

The second lens 720 with negative refractive power is made of a plastic material and includes an object-side surface 721 and an image-side surface 722, wherein the object-side surface 721 of the second lens 720 is concave near the optical axis 790, and the image-side surface 722 of the second lens 720 is concave near the optical axis 790. The object-side surface 721 and the image-side surface 722 are aspheric.

The third lens 730 with positive refractive power is made of a plastic material and includes an object-side surface 731 and an image-side surface 732, wherein the object-side surface 731 of the third lens 730 is concave near an optical axis 790, and the image-side surface 732 of the third lens 730 is convex near the optical axis 790. The object-side surface 731 and the image-side surface 732 are aspheric.

The fourth lens 740 with negative refractive power is made of plastic material and includes an object-side surface 741 and an image-side surface 742, wherein the object-side surface 741 of the fourth lens 740 is convex near an optical axis 790, and the image-side surface 742 of the fourth lens 740 is concave near the optical axis 790. The object-side surface 741 and the image-side surface 742 are aspheric.

The JR-cut filter 770 is made of glass, and is disposed between the fourth lens 740 and the image plane 780 without affecting a focal length of the optical lens assembly. It can be understood that, the JR-cut filter 770 may also be formed on the surface of the above-mentioned lens. The JR-cut filter 770 may also be made of other materials.

Refer to Table 18, Table 19 and Table 20 below.

TABLE 18

| | | Seventh embodiment f (focal length) = 1.68 mm (millimeters), Fno (f-number) = 2.07, FOV (field of view) = 95.02° (degrees). | | | | | |
|---|---|---|---|---|---|---|---|
| Surface | | Curvature radius (mm) | Central thickness/gap (mm) | Material | Refractive index (nd) | Abbe number (vd) | Focal length (mm) |
| 0 | Object | Infinity | Infinity | | | | |
| 1 | Stop | Infinity | −0.087 | | | | |
| 2 | First lens | 0.733 (ASP) | 0.268 | Plastic | 1.54 | 55.99 | 1.93 |
| 3 | | 2.086 (ASP) | 0.168 | | | | |
| 4 | Second lens | −5.315 (ASP) | 0.161 | Plastic | 1.67 | 19.24 | −7.34 |
| 5 | | 77.719 (ASP) | 0.091 | | | | |
| 6 | Third lens | −0.964 (ASP) | 0.325 | Plastic | 1.54 | 55.99 | 1.35 |
| 7 | | −0.468 (ASP) | 0.150 | | | | |
| 8 | Fourth lens | 1.430 (ASP) | 0.193 | Plastic | 1.54 | 55.99 | −1.67 |
| 9 | | 0.531 (ASP) | 0.603 | | | | |
| 10 | IR-cut filter | Infinity | 0.145 | Glass | 1.52 | 64.17 | |
| 11 | | Infinity | 0.077 | | | | |
| 12 | Image Plane | Infinity | — | | | | |

Reference wavelength 555 nm

TABLE 19

| | | Aspheric coefficient | | |
| --- | --- | --- | --- | --- |
| Surface | 2 | 3 | 4 | 5 |
| K: | −9.1452E−01 | −5.6918E+01 | 9.8715E+01 | −1.0934E+02 |
| A2: | 0.0000E+00 | 0.0000E+00 | 0.0000E+00 | 0.0000E+00 |
| A4 | −1.2623E+01 | −3.1760E+00 | 1.0969E+01 | −2.8674E−01 |
| A6: | 1.5544E+03 | 4.5362E+02 | −1.5433E+03 | 4.1375E+01 |
| A8: | −1.1119E+05 | −3.5424E+04 | 1.1040E+05 | −3.1752E+03 |
| A10: | 5.1510E+06 | 1.7666E+06 | −5.0260E+06 | 1.1626E+05 |
| A12: | −1.6289E+08 | −5.9554E+07 | 1.5379E+08 | −2.6759E+06 |
| A14: | 3.6350E+09 | 1.3998E+09 | −3.2842E+09 | 4.1740E+07 |
| A16: | −5.8424E+10 | −2.3428E+10 | 5.0108E+10 | −4.5701E+08 |
| A18: | 6.8318E+11 | 2.8239E+11 | −5.5289E+11 | 3.5718E+09 |
| A20: | −5.8130E+12 | −2.4556E+12 | 4.4185E+12 | −2.0002E+10 |
| A22: | 3.5590E+13 | 1.5257E+13 | −2.5316E+13 | 7.9539E+10 |
| A24: | −1.5266E+14 | −6.6026E+13 | 1.0133E+14 | −2.1901E+11 |
| A26: | 4.3521E+14 | 1.8901E+14 | −2.6893E+14 | 3.9652E+11 |
| A28: | −7.4039E+14 | −3.2165E+14 | 4.2514E+14 | −4.2408E+11 |
| A30: | 5.6861E+14 | 2.4634E+14 | −3.0298E+14 | 2.0273E+11 |

| | | | | |
| --- | --- | --- | --- | --- |
| Surface | 6 | 7 | 8 | 9 |
| K: | −1.2419E+00 | −6.8225E+00 | −3.4635E−01 | −4.2572E+00 |
| A2: | 0.0000E+00 | 0.0000E+00 | 0.0000E+00 | 0.0000E+00 |
| A4: | −7.1372E−01 | −5.9325E+00 | −4.8273E−01 | −5.5808E−01 |
| A6: | 1.2408E+02 | 1.0336E+02 | −1.7053E+01 | −7.9456E+00 |
| A8: | −4.4673E+03 | −1.7529E+03 | 1.4911E+02 | 7.9612E+01 |
| A10: | 9.7157E+04 | 2.2093E+04 | −7.8071E+02 | −4.1971E+02 |
| A12: | −1.4310E+06 | −1.9986E+05 | 2.9019E+03 | 1.4660E+03 |
| A14: | 1.5040E+07 | 1.3225E+06 | −7.9239E+03 | −3.6037E+03 |
| A16: | −1.1545E+08 | −6.5224E+06 | 1.6041E+04 | 6.3923E+03 |
| A18: | 6.5284E+08 | 2.4305E+07 | −2.4042E+04 | −8.2644E+03 |
| A20: | −2.7142E+09 | −6.8445E+07 | 2.6456E+04 | 7.7813E+03 |
| A22: | 8.1878E+09 | 1.4315E+08 | −2.1020E+04 | −5.2711E+03 |
| A24: | −1.7420E+10 | −2.1439E+08 | 1.1705E+04 | 2.4992E+03 |
| A26: | 2.4763E+10 | 2.1601E+08 | −4.3267E+03 | −7.8636E+02 |
| A28: | −2.1099E+10 | −1.3052E+08 | 9.5279E+02 | 1.4737E+02 |
| A30: | 8.1440E+09 | 3.5610E+07 | −9.4554E+01 | −1.2441E+01 |

In the seventh embodiment, an aspheric curve equation is expressed as that in the first embodiment. In addition, definitions of parameters in the following tables are the same as those in the first embodiment, and are not repeated herein.

TABLE 20

| | | | |
| --- | --- | --- | --- |
| IMH | 1.90 mm | CA1 | 0.41 mm |
| CRA | 36.81° | CA6 | 0.71 mm |
| TDP1 | 0.11 mm | CA8 | 1.30 mm |
| TDP4 | 0.03 mm | Y42C | 0.70 mm |
| TDP6 | 0.24 mm | ET3 | 0.16 mm |

Referring to Table 18 and Table 20, the following data may be calculated:

| | | | |
| --- | --- | --- | --- |
| | | Seventh embodiment | |
| TL*HFOV/ (CA8*IMH) | 42.07°/mm | R2*R4/R1 | 221.20 mm |
| TL*(CT3/ET3) | 4.48 mm | TDP6/TDP4 | 8.97 |
| BFL/TDP1 | 7.60 | CA6/T34 | 4.74 |
| IMH/(EPD*CA1) | 5.72 mm⁻¹ | TL/BFL | 2.64 |
| (vd1 + vd3)/vd2 | 5.82 | f4/Y42C | −2.37 |
| CRA/EPD | 45.17°/mm | IMH*Tan(HFOV)/ (BFL*CA6) | 3.53 mm⁻¹ |
| ΣAT/(T12 + T34) | 1.29 | TL/ (Tan(HFOV)*IMH) | 1.05 |

Eighth Embodiment

Refer to FIG. 8A and FIG. 8B. FIG. 8A is a schematic view of an optical lens assembly according to an eighth embodiment of the present disclosure, and FIG. 8B shows a field curvature curve and a distortion curve of an optical lens assembly according to a second embodiment. As can be seen from FIG. 8A, the optical lens assembly includes, in order from an object side to an image side: a stop 800, a first lens 810, a second lens 820, a third lens 830, a fourth lens 840, an IR-cut filter 870, and an image plane 880. A total quantity of lenses with refractive power in the optical lens assembly is four, but not limited thereto.

The first lens 810 with positive refractive power is made of a plastic material and includes an object-side surface 811 and an image-side surface 812, wherein the object-side surface 811 of the first lens 810 is convex near an optical axis 890, and the image-side surface 812 of the first lens 810 is concave near the optical axis 890. The object-side surface 811 and the image-side surface 812 are aspheric.

The second lens 820 with positive refractive power is made of a plastic material and includes an object-side surface 821 and an image-side surface 822, wherein the object-side surface 821 of the second lens 820 is convex near the optical axis 890, and the image-side surface 822 of the second lens 820 is concave near the optical axis 890. The object-side surface 821 and the image-side surface 822 are aspheric.

The third lens 830 with positive refractive power is made of a plastic material and includes an object-side surface 831 and an image-side surface 832, wherein the object-side surface 831 of the third lens 830 is concave near an optical axis 890, and the image-side surface 832 of the third lens 830 is convex near the optical axis 890. The object-side surface 831 and the image-side surface 832 are aspheric.

The fourth lens 840 with negative refractive power is made of a plastic material and includes an object-side surface 841 and an image-side surface 842, wherein the object-side surface 841 of the fourth lens 840 is convex near an optical axis 890, and the image-side surface 842 of the fourth lens 840 is concave near the optical axis 890. The object-side surface 841 and the image-side surface 842 are aspheric.

The IR-cut filter 870 is made of glass, and is disposed between the fourth lens 840 and the image plane 880 without affecting a focal length of the optical lens assembly. It can be understood that, the IR-cut filter 870 may also be formed on the surface of the above-mentioned lens. The IR-cut filter 870 may also be made of other materials.

Refer to Table 21, Table 22 and Table 23 below.

TABLE 21

Seventh embodiment
f (focal length) = 1.77 mm (millimeters), Fno (f-number) =
2.07, FOV (field of view) = 92.76° (degrees).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | Infinity | | | | |
| 1 | Stop | Infinity | −0.087 | | | | |
| 2 | First lens | 0.796 (ASP) | 0.243 | Plastic | 1.54 | 55.99 | 2.32 |
| 3 | | 1.912 (ASP) | 0.214 | | | | |
| 4 | Second lens | 8.200 (ASP) | 0.139 | Plastic | 1.67 | 19.24 | 120.82 |
| 5 | | 9.051 (ASP) | 0.167 | | | | |
| 6 | Third lens | −1.036 (ASP) | 0.276 | Plastic | 1.54 | 55.99 | 1.71 |
| 7 | | −0.537 (ASP) | 0.157 | | | | |
| 8 | Fourth lens | 1.030 (ASP) | 0.215 | Plastic | 1.54 | 55.99 | −1.70 |
| 9 | | 0.453 (ASP) | 0.513 | | | | |
| 10 | IR-cut filter | Infinity | 0.145 | Glass | 1.52 | 64.17 | |
| 11 | | Infinity | 0.100 | | | | |
| 12 | Image Plane | Infinity | — | | | | |

Reference wavelength 555 nm

30

TABLE 22

Aspheric coefficient

| Surface | 2 | 3 | 4 | 5 |
|---|---|---|---|---|
| K: | 2.1160E−02 | 1.0636E+01 | 2.1017E+01 | −2.7710E+01 |
| A2: | 0.0000E+00 | 0.0000E+00 | 0.0000E+00 | 0.0000E+00 |
| A4: | −4.3168E−01 | −2.6605E−01 | 3.2423E−01 | 6.8507E−01 |
| A6: | 1.5053E+01 | 5.4213E+00 | −2.8143E+01 | −1.0712E+01 |
| A8: | −2.0978E+02 | −1.5201E+02 | 3.5471E+02 | −4.1790E+01 |
| A10: | 2.7513E+02 | 6.4702E+02 | −3.9564E+03 | 1.6000E+03 |
| A12: | 2.5474E+04 | 1.6685E+04 | 3.9125E+04 | −1.5360E+04 |
| A14: | −3.1544E+05 | −2.5343E+05 | −2.8928E+05 | 7.8650E+04 |
| A16: | 1.7121E+06 | 1.4795E+06 | 1.3403E+06 | −2.3232E+05 |
| A18: | −4.5295E+06 | −4.0423E+06 | −3.3506E+06 | 3.8105E+05 |
| A20: | 4.7312E+06 | 4.2574E+06 | 3.4161E+06 | −2.7061E+05 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

| Surface | 6 | 7 | 8 | 9 |
|---|---|---|---|---|
| K: | −7.0254E+00 | −1.1318E+00 | −3.0832E+01 | −4.8413E+00 |
| A2: | 0.0000E+00 | 0.0000E+00 | 0.0000E+00 | 0.0000E+00 |
| A4: | −8.5372E−01 | −3.4661E−01 | 2.0020E−01 | −7.7753E−01 |
| A6: | 4.9716E+01 | 3.6096E+01 | −8.2065E+00 | 7.9652E−01 |
| A8: | −8.1437E+02 | −4.5376E+02 | 3.5879E+01 | −9.1785E−02 |
| A10: | 7.2237E+03 | 3.0284E+03 | −8.4132E+01 | −6.5444E−01 |
| A12: | −3.8583E+04 | −1.2003E+04 | 1.1956E+02 | 5.2397E−03 |
| A14: | 1.2667E+05 | 2.9270E+04 | −1.0481E+02 | 1.2353E+00 |
| A16: | −2.5012E+05 | −4.3128E+04 | 5.5362E+01 | −1.3576E+00 |
| A18: | 2.7300E+05 | 3.5211E+04 | −1.6166E+01 | 6.0451E−01 |
| A20: | −1.2687E+05 | −1.2229E+04 | 2.0053E+00 | −1.0014E−01 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

In the eighth embodiment, an aspheric curve equation is expressed as that in the first embodiment. In addition, definitions of parameters in the following tables are the same as those in the first embodiment, and are not repeated herein.

TABLE 23

| IMH | 1.90 mm | CA1 | 0.43 mm |
|---|---|---|---|
| CRA | 37.85° | CA6 | 0.76 mm |
| TDP1 | 0.12 mm | CA8 | 1.28 mm |
| TDP4 | 0.01 mm | Y42C | 1.56 mm |
| TDP6 | 0.26 mm | ET3 | 0.13 mm |

Referring to Table 21 and Table 23, the following data may be calculated:

| Eighth embodiment | | | |
|---|---|---|---|
| TL*HFOV/ (CA8*IMH) | 41.18°/mm | R2*R4/R1 | 21.75 mm |
| TL*(CT3/ET3) | 4.46 mm | TDP6/TDP4 | 25.02 |
| BFL/TDP1 | 6.20 | CA6/T34 | 4.83 |
| IMH/(EPD*CA1) | 5.22 mm$^{-1}$ | TL/BFL | 2.86 |
| (vd1 + vd3)/vd2 | 5.82 | f4/Y42C | −1.09 |
| CRA/EPD | 44.34°/mm | IMH*Tan(HFOV)/ (BFL*CA6) | 3.47 mm$^{-1}$ |
| ΣAT/(T12 + T34) | 1.45 | TL/(Tan(HFOV)*IMH) | 1.09 |

Ninth Embodiment

Refer to FIG. 9. FIG. 9 is a schematic view of a photographing module 4000 according to a ninth embodiment of the present disclosure. The photographing module includes a lens barrel 1000, an optical lens assembly 3000, and an image sensor 2000. The optical lens assembly 3000 can be the optical lens assemblies according to the above-mentioned embodiments, and the optical lens assembly 3000 is disposed in the lens barrel 1000. The image sensor 2000 is disposed on an image plane of the optical lens assembly 3000, and is an electronic photosensitive element (e.g., CMOS, CCD) with good sensitivity and low noise, so as to truly present the image quality of the optical lens assembly.

In the foregoing embodiments, those with ordinary knowledge in the art should understand that, in the optical lens assembly and the photographing module provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

In the optical lens assembly provided by the present disclosure, the maximum effective radius of a lens surface usually refers to the radius of the maximum effective optical area of the lens surface (usually it can refer to the area where the lens has not undergone surface treatment, polishing treatment, or light-shielding layer, but not limited to this).

The optical lens assembly and the photographing module provided in the present disclosure can be used in many technical applications such as portable electronic device, photography, monitoring equipment, automation equipment, vehicle surround systems, and electronic imaging systems of the Internet of Things (IoT) devices, but not limited thereto.

What is claimed is:

1. An optical lens assembly, in order from an object side to an image side, comprising:
   a first lens with positive refractive power;
   a second lens with refractive power;
   a third lens with positive refractive power; and
   a fourth lens with negative refractive power;
   wherein a distance from an object-side surface of the first lens to an image plane along an optical axis is TL, a half of a maximum field of view of the optical lens assembly is HFOV, a maximum optical effective radius of an image-side surface of the fourth lens is CA8, a maximum image height of the optical lens assembly is IMH, and the following condition is satisfied: 32.46°/mm<TL*HFOV/(CA8*IMH)<54.39°/mm.

2. The optical lens assembly according to claim 1, wherein a central thickness of the third lens along the optical axis is CT3, an edge thickness of the third lens is ET3, and the following condition is satisfied: 3.39 mm<TL*(CT3/ET3)<6.83 mm.

3. The optical lens assembly according to claim 1, wherein a distance from the image-side surface of the fourth lens to the image plane along the optical axis is BFL, a distance in parallel with the optical axis from an axial point on the object-side surface of the first lens to a maximum optical effective radius position of the object-side surface of the first lens is TDP1, and the following condition is satisfied: 4.96<BFL/TDP1<15.32.

4. The optical lens assembly according to claim 1, wherein an entrance pupil diameter of the optical lens assembly is EPD, a maximum optical effective radius of the object-side surface of the first lens is CA1, and the following condition is satisfied: 3.53 mm$^{-1}$<IMH/(EPD*CA1)<7.28 mm$^{-1}$.

5. The optical lens assembly according to claim 1, wherein an Abbe number of the first lens is vd1, an Abbe number of the second lens is vd2, an Abbe number of the third lens is vd3, and the following condition is satisfied: 3.74<(vd1+vd3)/vd2<6.98.

6. The optical lens assembly according to claim 1, wherein an incident angle where a chief ray is incident on the image plane at a maximum view angle of the optical lens assembly is CRA, an entrance pupil diameter of the optical lens assembly is EPD, and the following condition is satisfied: 29.61°/mm<CRA/EPD<54.20°/mm.

7. The optical lens assembly according to claim 1, wherein a sum of the distances between any two adjacent lenses along the optical axis is ΣAT, a distance from the image-side surface of the first lens to the object-side surface of the second lens along the optical axis is T12, a distance from the image-side surface of the third lens to the object-side surface of the fourth lens along the optical axis is T34, and the following condition is satisfied: 0.99<ΣAT/(T12+T34)<2.05.

8. The optical lens assembly according to claim 1, wherein a curvature radius of the object-side surface of the first lens is R1, a curvature radius of an image-side surface of the first lens is R2, a curvature radius of an image-side surface of the second lens is R4, and the following condition is satisfied: −2354.04 mm<R2*R4/R1<265.45 mm.

9. The optical lens assembly according to claim 1, wherein a distance in parallel with the optical axis from an axial point on an image-side surface of the second lens to a maximum optical effective radius position of the image-side surface of the second lens is TDP4, a distance in parallel with the optical axis from an axial point on an image-side surface of the third lens to a maximum optical effective radius position of the image-side surface of the third lens is TDP6, and the following condition is satisfied: 2.99<TDP6/TDP4<80.51.

10. The optical lens assembly according to claim 1, wherein a maximum optical effective radius of an image-side surface of the third lens is CA6, a distance from the image-side surface of the third lens to the object-side surface of the fourth lens along the optical axis is T34, and the following condition is satisfied: 2.69<CA6/T34<28.28.

11. The optical lens assembly according to claim 1, wherein a distance from the image-side surface of the fourth lens to the image plane along the optical axis is BFL, and the following condition is satisfied: 1.95<TL/BFL<3.43.

12. The optical lens assembly according to claim 1, wherein a focal length of the fourth lens is f4, a distance perpendicular to the optical axis between a critical point on the image-side of the fourth lens and the optical axis is Y42C, and the following condition is satisfied: −5.90<f4/Y42C<−0.88.

13. The optical lens assembly according to claim 1, wherein a distance from the image-side surface of the fourth lens to the image plane along the optical axis is BFL, a maximum optical effective radius of the image-side surface of the third lens is CA6, and the following condition is satisfied: 1.81 mm$^{-1}$<IMH*Tan(HFOV)/(BFL*CA6)<4.38 mm$^{-1}$.

14. The optical lens assembly according to claim 1, wherein the following condition is satisfied: 0.84<TL/(Tan(HFOV)*IMH)<1.74.

15. A photographing module, comprising:
a lens barrel;
an optical lens assembly disposed in the lens barrel; and
an image sensor disposed on an image plane of the optical lens assembly;
wherein the optical lens assembly, in order from an object side to an image side, comprising:
a first lens with positive refractive power;
a second lens with refractive power;
a third lens with positive refractive power; and
a fourth lens with negative refractive power;
wherein a distance from an object-side surface of the first lens to an image plane along an optical axis is TL, a half of a maximum field of view of the optical lens assembly is HFOV, a maximum optical effective radius of an image-side surface of the fourth lens is CA8, a maximum image height of the optical lens assembly is IMH, and the following condition is satisfied: 32.46°/mm<TL*HFOV/(CA8*IMH)<54.39°/mm.

16. The photographing module according to claim 15, wherein a distance from the image-side surface of the fourth lens to the image plane along the optical axis is BFL, a distance in parallel with the optical axis from an axial point on the object-side surface of the first lens to a maximum optical effective radius position of the object-side surface of the first lens is TDP1, and the following condition is satisfied: 4.96<BFL/TDP1<15.32.

17. The photographing module according to claim 15, wherein an incident angle where a chief ray is incident on the image plane at a maximum view angle of the optical lens assembly is CRA, an entrance pupil diameter of the optical lens assembly is EPD, and the following condition is satisfied: 29.61°/mm<CRA/EPD<54.20°/mm.

18. The photographing module according to claim 15, wherein a curvature radius of the object-side surface of the first lens is R1, a curvature radius of an image-side surface of the first lens is R2, a curvature radius of an image-side surface of the second lens is R4, and the following condition is satisfied: −2354.04 mm<R2*R4/R1<265.45 mm.

19. The photographing module according to claim 15, wherein a maximum optical effective radius of an image-side surface of the third lens is CA6, a distance from the image-side surface of the third lens to the object-side surface of the fourth lens along the optical axis is T34, and the following condition is satisfied: 2.69<CA6/T34<28.28.

20. The photographing module according to claim 15, wherein a focal length of the fourth lens is f4, a distance perpendicular to the optical axis between a critical point on the image-side of the fourth lens and the optical axis is Y42C, and the following condition is satisfied: −5.90<f4/Y42C<−0.88.

* * * * *